US012449508B2

(12) United States Patent
Li

(10) Patent No.: US 12,449,508 B2
(45) Date of Patent: Oct. 21, 2025

(54) SPATIAL-BLOCK CODE DIVISION MULTIPLEXING (CDM) FOR MULTIPLE INPUT MULTIPLE OUTPUT (MIMO) WAVEFORMS

(71) Applicant: Aptiv Technologies AG, Schaffhausen (CH)

(72) Inventor: Zhengzheng Li, Agoura Hills, CA (US)

(73) Assignee: Aptiv Technologies AG, Schaffhausen (CH)

( * ) Notice: Subject to any disclaimer, the term of this patent is extended or adjusted under 35 U.S.C. 154(b) by 361 days.

(21) Appl. No.: 17/929,984

(22) Filed: Sep. 6, 2022

(65) Prior Publication Data

US 2023/0104290 A1   Apr. 6, 2023

Related U.S. Application Data

(60) Provisional application No. 63/252,338, filed on Oct. 5, 2021.

(51) Int. Cl.
*G01S 7/35* (2006.01)
*G01S 13/58* (2006.01)
*G01S 13/931* (2020.01)

(52) U.S. Cl.
CPC ............ *G01S 7/354* (2013.01); *G01S 13/584* (2013.01); *G01S 13/931* (2013.01)

(58) Field of Classification Search
CPC ....... G01S 7/354; G01S 13/584; G01S 13/931
See application file for complete search history.

(56) References Cited

U.S. PATENT DOCUMENTS

| 7,474,262 | B2 | 1/2009 | Alland |
| 9,182,476 | B2 | 11/2015 | Wintermantel |
| 2017/0160380 | A1* | 6/2017 | Searcy .................. G01S 13/288 |

(Continued)

FOREIGN PATENT DOCUMENTS

EP   3611538 A1   2/2020

OTHER PUBLICATIONS

"Extended European Search Report", EP Application No. 22196046.1, Mar. 1, 2023, 8 pages.

*Primary Examiner* — Vladimir Magloire
*Assistant Examiner* — Nazra Nur Waheed
(74) *Attorney, Agent, or Firm* — Harness, Dickey & Pierce, P.L.C.

(57) ABSTRACT

Techniques and systems are described for Spatial-Block Code Division Multiplexing (CDM) for MIMO waveforms. A radar system includes multiple transmitters, receivers, and phase shifters. Electromagnetic (EM) signals are transmitted and received in a Spatial-Block CDM scheme. Each spatial block has multiple slots outnumbering the channels. In addition, each slot corresponds to a specific code of phase shifts applied across the channels by the phase shifters during that slot. Fast-Fourier Transformations are applied to reflections of the EM signals to generate complex observations at each of the channels during each slot. Based on the observations, whether a Doppler phase shift exists between two slots can be determined based in part on whether the phase shift has one or multiple possible values. The techniques allow velocities to be resolved, despite a mixed-Doppler interval detected. Analog beamforming is supported; slots can be directed at particular angles to change gain in a field of view.

19 Claims, 11 Drawing Sheets

(56) References Cited

U.S. PATENT DOCUMENTS

| | | |
|---|---|---|
| 2020/0081110 A1 | 3/2020 | Nam et al. |
| 2020/0182991 A1 | 6/2020 | Hakobyan et al. |
| 2020/0191939 A1* | 6/2020 | Wu .................. G01S 7/354 |
| 2021/0270933 A1* | 9/2021 | Hakobyan ............ G01S 7/354 |

* cited by examiner

SPATIAL-BLOCK CODE DIVISION MULTIPLEXING (CDM) FOR MULTIPLE INPUT MULTIPLE OUTPUT (MIMO) WAVEFORMS

CROSS-REFERENCE TO RELATED APPLICATION

This application claims the benefit of U.S. Provisional Patent Application No. 63/252,338, filed Oct. 5, 2021, which is incorporated by reference herein in its entirety.

BACKGROUND

Radar systems transmit and receive electromagnetic (EM) signals for detecting and tracking objects. In automotive applications, radar systems provide information about the vehicle's environment and can play an essential role in Advanced Driver Assistance Systems (ADAS). Highly automated systems generally require radar data with high resolution in range, Doppler, and angular dimensions. Popular approaches to achieving improved angular dimensions include adopting multiple-input and multiple-output (MIMO) radar techniques. MIMO techniques can provide relatively large virtual arrays with reduced angular ambiguity. Virtual arrays may be formed that are larger than a physical aperture. Depending on the waveforms, existing MIMO techniques, however, can lead to various issues including Doppler aliasing, as well as inadequate coverage.

SUMMARY

This document describes Spatial-Block Code Division Multiplexing (CDM) for MIMO waveforms. A MIMO radar system can adopt Spatial-Block CDM to resolve all MIMO channels, detect mixed Doppler intervals, resolve velocities in these situations, and/or perform analog beamforming (e.g., to achieve higher sensitivity at angles of interest). In one example, a system includes multiple transmitters configured to simultaneously emit multiple electromagnetic (EM) signals across multiple channels. The system further includes multiple receivers configured to obtain reflections of the EM signals from one or more objects, in addition to multiple phase shifters configured to introduce at least one phase shift in the EM signals or the reflections. Further included in the system is at least one processor. The processor is configured to cause the transmitters to emit the EM signals as sequential spatial blocks. Each spatial block has multiple slots outnumbering the channels. Each slot corresponding to a specific code of phase shifts applied by the phase shifters across the channels during that slot. The processor is further configured to apply a respective Fast-Fourier Transformation to the reflections to generate complex observations at each of the channels during each of the slots, and determine, based on the complex observations, whether a Doppler phase shift between two of the slots has multiple possible values. The processor is configured to output an indication of a mixed Doppler interval detected in that spatial block in response to determining that the Doppler phase shift between two of the slots has multiple possible values.

This document also describes methods performed by the above-summarized system and other configurations of a radar system set forth herein, including means for performing these methods. This Summary introduces simplified concepts related to enabling Spatial-Block CDM in a MIMO radar system, which are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of Spatial-Block CDM for MIMO waveforms are described in this document with reference to the Drawings that may use same numbers to reference like features and components, and hyphenated numbers to designate variations of these like features and components. The Drawings are organized as follows:

FIGS. 3-1, 3-2, and 3-3 illustrate example conceptual diagrams of a radar system that uses Spatial-Block CDM for MIMO waveforms, in accordance with techniques of this disclosure;

DETAILED DESCRIPTION

Introduction

Figure 1:
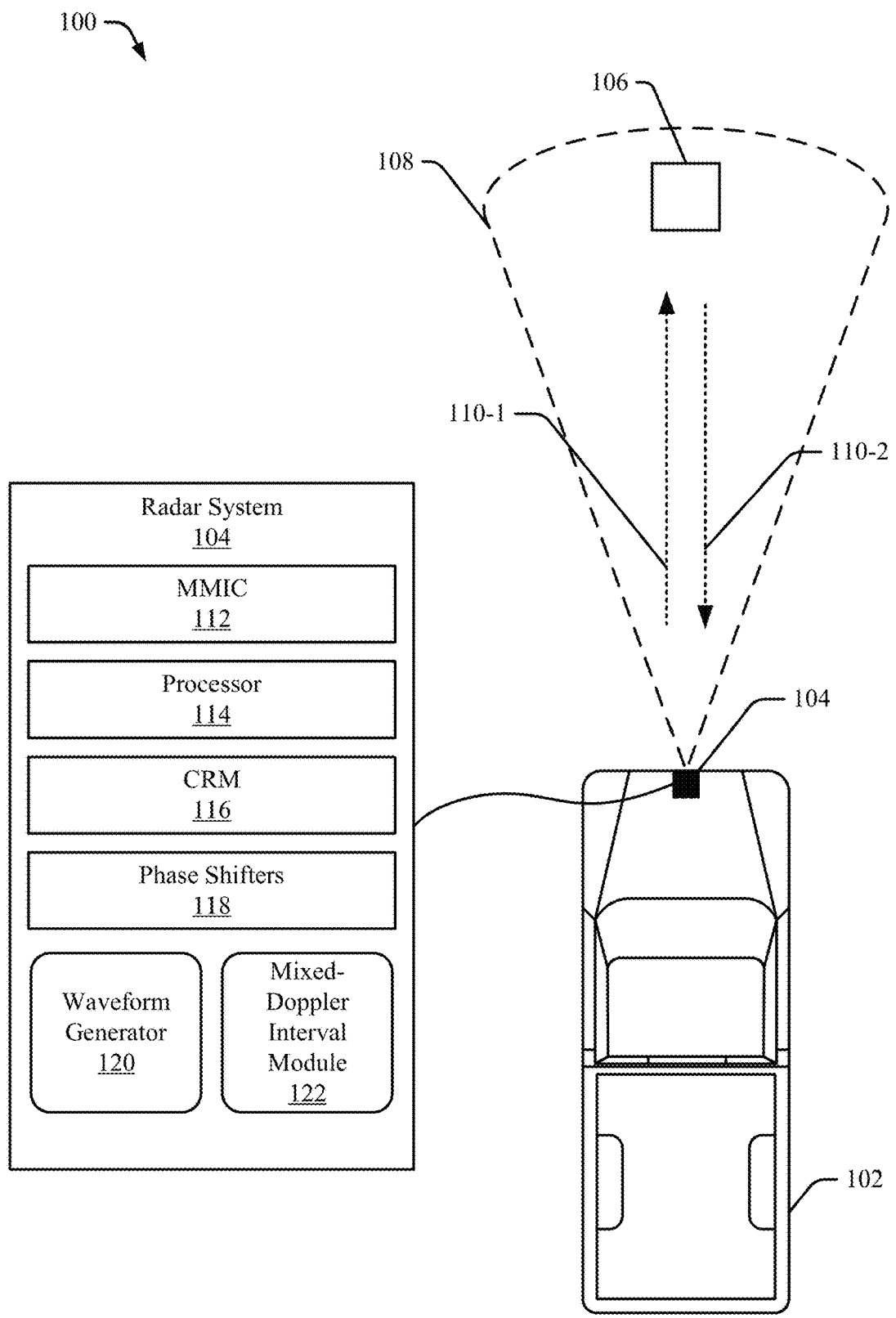
FIG. 1 illustrates an example environment in which a radar system is configured to use Spatial-Block CDM for MIMO waveforms, in accordance with techniques of this disclosure.

Radar systems can be configured as an important sensing technology that vehicle-based systems use to acquire information about a surrounding environment. For example, vehicle-based systems can use radar systems to detect objects in or near a roadway and, if necessary, take actions (e.g., reduce speed, change lanes) to avoid a collision. Radar systems generally include at least two antennas to transmit and receive radar (e.g., EM) signals. Many vehicle-based systems require high resolution in range, Doppler frequency, and angle. These systems also require accurate discrimination between multiple targets with similar Doppler frequencies.

Often these requirements are addressed by including more antenna channels in radar systems. For example, some automotive radar systems operate MIMO radars to increase the number of channels and improve angular resolution. A MIMO radar system with three transmit channels and four receive channels can form a virtual array (also referred to as a "synthetic array") of twelve channels. With additional channels, a MIMO radar system can operate with an improved angular resolution, relying on a flexible physical layout of inexpensive and possibly fewer hardware components than non-MIMO radar systems.

MIMO radar systems use orthogonal waveforms to transmit and receive independent, orthogonal EM signals, from which, the different channels are separately identified. Radar systems can implement orthogonal waveforms in various ways, including using time-division multiplexing (TDM), frequency-division multiplexing (FDM), and code-division multiplexing (CDM) techniques. Despite these benefits, existing orthogonal waveform techniques have drawbacks.

TDM techniques generally place signals from transmit channels in different sequential time slots assigned to the transmit signals. TDM is commonly used in automotive applications, due to its straightforward implementation and near perfect orthogonality that results among MIMO channels as channels are transmitting and/or receiving in a sequential manner. However, when TDM techniques are applied to a fast-time (range) domain, a range-dependent phase offset may be introduced among channels, which reduces range coverage. Because TDM antenna channels are not activated simultaneously, TDM can lead to reduced sensitivity and issues in angle estimation because of a phase offset introduced by Doppler effects when targets are moving. In addition, TDM techniques can require a higher sampling rate due to increased intermediate time or frequency bandwidth. This causes an increase in processing complexity and/or power consumption, when compared to operating at lower sampling rates.

FDM and CDM techniques can improve upon TDM. In FDM, signals from different transmit channels are assigned to different frequency bands by adding unique frequency offsets to each transmit signal, which causes each channel to support radar transmissions occupying different (e.g., non-overlapping) frequency bands. CDM can enhance FDM by introducing a modulated code sequence into the radar transmissions that occupy the changing frequency bands. A return signal can be recovered by matching a coded signal within the return signal to a current transmission code, e.g., after suppressing energy from other coded signals. TDM, FDM, and CDM can each effectively operate in both fast-time domains (e.g., within a chirp, range domain) and slow-time domains (e.g., chirp to chirp, Doppler domain). Unlike TDM, both FDM and CDM systems support simultaneous transmit and receive operations, but both require a frequency shift or coding to be applied to the channels, which is achieved by phase shifters in transmit and/or receive channels.

A MIMO system can have phase shifters in transmit channels only, phase shifters in receive channels only, or a combination of phase shifters in both transmit and receive channels. Depending on the number of bits available in a phase shifter, two or more phase stages can be achieved. For instance, one-bit phase shifters are known as binary phase shifters that form two individual phase stages; one phase stage alters a phase of a signal whereas the other stage does not alter the phase. In contrast, phase shifters with more than one bit are known as polyphase phase shifters and can support more than two phase stages to alter a phase of a signal by more amounts, and/or by no alteration at all.

A Frequency Modulated Continuous Waveform (FMCW) is an example waveform adopted by MIMO radars for automotive applications of FDM and CDM. MIMO coding for an FMCW radar system may be implemented in an intra-chirp manner (e.g., within a single chirp) and/or inter-chirp manner (e.g., across multiple chirps). Intra-chirp coding (also referred to as fast time coding) may introduce issues such as distortions to range measurements and, therefore, may be undesirable for automotive applications. On the other hand, inter-chirp coding (also referred to as slow time coding) is more popular and widely documented for automotive use, and sometimes includes coding chirp pulses with different phase sequences. To improve performance of MIMO radar using FDM and CDM techniques, spatially encoded MIMO techniques can be applied. Spatially encoded MIMO techniques build upon inter chirp coding techniques. Unlike traditional FDM and CDM schemes, a spatially encoded MIMO waveform enables simultaneous activation of multiple transmit channels such that each carries a transmit signal, which is uniquely coded into multiple spatially defined blocks.

Consider a FMCW radar system with two transmit channels TX1 and TX2. The radar system is configured to implement a traditional spatially encoded waveform. This means that during each frame, the radar system utilizes the two channels TX1 and TX2 to simultaneously output two different signals S1 and S2, respectively. A sum of the signals S1 and S2 may form an analog beam pointed at zero degrees in a field of view. A difference between the signals S1 and S2 may form a null beam at zero degrees. Each of the signals S1 and S2 is coded during the course of their transmissions into spatially defined blocks, each of which include multiple chirp periods. The blocks are separated into slots. Each slot captures one chirp period. For example, the blocks for the signals S1 and S2 can include two slots. A first slot includes a first chirp from each of the signals S1 and S2, and a second slot includes a second chirp from each of the signals S1 and S2. With two slots defined, the two signals S1 and S2 can be resolved for the entire block.

To resolve the signals S1 and S2, respective Fast-Fourier Transformation (FFT) associated with each of the slots is applied to the radar returns for the signals S1 and S2. A first FFT is applied to radar returns from the signals S1 and S2 included in a first slot of the block. This generates a combined signal Sa for the first slot, which is equal to a sum of the signal S1 and the signal S2 during that first slot. A second FFT is applied to radar returns from the signals S1 and S2 included in a second slot of the block. This generates a combined signal Sb for the second slot, which is equal to a difference between the signal S2 and the signal S1, during that second slot.

By evaluating the combined signals Sa and Sb obtained for the two different slots, the individual signals S1 and S2 can be derived for the entire block. For example, the signal S1 can be found by halving a sum of the signals Sa and Sb, as shown in Equation 1:

$$S1=(Sa+Sb)/2 \qquad \text{Equation 1.}$$

In addition, Equation 2 provides a solution for the signal S2, which includes halving a difference between the signals Sa and Sb.

$$S2=(Sa-Sb)/2 \qquad \text{Equation 2.}$$

Existing spatially encoded MIMO waveform techniques such as this are limited to binary phase modulation (BPM) code implementations, which restricts their application to radar configurations with few channels. To support more channels, a Hadamard coding scheme can be used within the slots of each block. However, the solutions provided by these techniques may only work when there are zero possible Doppler effects (e.g., Eq.1 and 2 are only valid when measured velocity is 0). Existing spatially encoded MIMO waveforms may cause a radar system to fail to account for phase differences that can arise from one slot to the next when targets are moving. Such a failure can be detrimental for an automotive application because this unique phase offset, can cause mixed Doppler intervals, which can cause aliasing in Doppler measurements. For the previous and other examples, this can lead to parity issues in velocity measurements derived from the signals S1 and S2. Existing spatially encoded MIMO waveforms are unreliable for many vehicle applications involving common driving situations when targets are moving.

Overview

In contrast to previous waveform techniques, this document describes techniques and systems to provide spatially encoded MIMO waveforms through adopting a Spatial-Block CDM scheme. This scheme is specifically adapted for MIMO waveforms, including for detecting mixed-Doppler intervals, resolving velocities in such cases, and implementing analog beamforming. Doppler effects when targets are moving are considered using a signal model that can account for Doppler shifts among complex observations sampled at different times.

For example, consider a two channel example, in which the signals S1 and S2 are orthogonally transmitted at the same time. A first slot can be used to derive the signal Sa, and a second slot can be used to derive the signal Sb. However, rather than model the signal Sb as a difference between the signals S1 and S2 across two different slots, at least one third slot is used to obtain more information and account for possible Doppler effects from one slot to the next. Using more slots than channels allows the signal Sb to be modeled with an adjustment or compensation applied, as shown in Equation 3:

$$Sb = (S1 - S2) * e^{j2\pi f_d \cdot \Delta t} \qquad \text{Equation 3.}$$

The term $f_d$ from Equation 3 is a Doppler frequency for a slot j. A sampling time difference $\Delta t$ represents a time period $T_P$ until a start of a next occurrence of that same slot j (e.g., a duration of the block). For example, each occurrence of a slot j coincides with a time period $T_S$. When two slots are used, the time period $T_P$ equals two times the time period $T_S$.

When no Doppler ambiguity exists, the Doppler frequency $f_d$ for the slot j can be estimated from FFTS that are applied to Doppler measurements obtained for the signals Sa and Sb. Otherwise, the Doppler frequency $f_d$ for the signals S1 or S2 can be determined from Equation 4:

$$f_d = -2v_s/(\lambda) \qquad \text{Equation 4.}$$

In Equation 4, the Doppler frequency $f_d$ of the signal S1 or S2 is set equal to a ratio between twice a measured velocity $v_s$, which is computed over the time period $T_S$ for each slot, and a negative wavelength of that transmit signal S1 or S2.

Because each occurrence of a slot j coincides with a time period $T_S$ (which is smaller than time period $T_P$), needed is a way to compute a measured velocity $v_s$, which can then be used to solve Equation 3 including computing a compensation to apply to the terms S1 and S2 for computing the signal Sb. However, the measured velocity $v_s$ for each slot may be aliased with respect to a measured velocity $v_p$, which is measured over time period $T_P$ (e.g., across all slots of the block). Ambiguity in velocity estimates from simultaneous transmissions may be unavoidable when targets move, which severely limits usefulness of radar in common driving situations. For resolving velocity and handling aliasing in cases such as this, an example Spatial-Block CDM scheme described herein uses more slots than channels.

The Spatial-Block CDM scheme described herein can be used to detect mixed-Doppler intervals where ambiguity can arise. An example radar system can adopt the described techniques to provide a more accurate way to resolve returns from simultaneous transmissions, including accounting for Doppler effects between different slots. At least one processor of the radar system may cause multiple transmitters to emit EM signals as sequential spatial blocks. Each spatial block has a quantity of N channels, and a quantity of M slots outnumbering the channels. That is, unlike other waveform techniques, M slots are used to define each spatial block instead of using just one slot per channel. Each slot corresponds to a specific code of phase shifts applied by the phase shifters across the channels during that slot. The specific code of phase shifts corresponding to at least two of the slots may be a same code of phase shifts. In addition, the specific code of phase shifts corresponding to at least two other of the slots is a unique code of phase shifts. All N channels can be activated with different initial phases at each of the M slots. A MIMO waveform is described that can transmit each spatial block of information to include more than just N slots, thereby enabling more information to be obtained during each spatial block. This additional information enables detection and/or compensation of possible errors caused by Doppler effects from moving targets.

The processor can apply a corresponding FFT across the N channels at each of the M slots. Applying a respective FFT to the reflections can generate complex observations at each of the N channels during each of the M slots. Based on the complex observations, the processor can determine whether a Doppler phase shift between two of the slots has multiple possible values. The processor may be configured to detect a mixed Doppler interval within a spatial block in response to determining that a Doppler phase shift between two slots in that spatial block has more than just one possible value.

Detecting a mixed Doppler interval can be handled in various ways. For example, an indication of a mixed Doppler interval can be output as a flag or associated with the complex observations in that spatial block to warn that its use may introduce ambiguity. In some cases where a mixed Doppler interval is detected, ambiguity that may otherwise appear in measurements (e.g., velocities) can be derived for each of the M slots. Deriving the ambiguity, e.g., using a process based on application of a least square estimate, can allow the signals on all N channels to be accurately resolved, including by removing Doppler ambiguity otherwise introduced.

In addition, the MIMO waveform described herein can be used to provide a focused analog beam (e.g., performing beamforming) within each M slots to achieve higher gain at angles of interests. The proposed Spatial-Block CDM scheme can work with binary phase shifters or polyphase phase shifters. With binary phase shifters, focused beams can be formed at boresight. With polyphase phase shifters, multiple focused beams pointing at different angles of interest may be formed to get higher sensitivity.

In this way, the described techniques and systems support MIMO radar systems to accurately recover reflections for developing radar data, such as a range and/or Doppler representation of detections to objects in a field of view. This example is just one example of the described techniques and systems of a radar system using Spatial-Block CDM. This document describes other examples and implementations.

Operating Environment

FIG. 1 illustrates an example environment 100 in which a radar system 104 can use Spatial-Block CDM for MIMO waveforms, in accordance with the techniques of this disclosure. Depicted in the environment 100, a vehicle 102 is equipped with an onboard radar system 104. The depicted environment 100 includes the vehicle 102 traveling on a roadway. Although illustrated as a passenger truck, the vehicle 102 can represent other types of motorized vehicles (e.g., an automobile, a limousine, a car, a truck, a motorcycle, a bus, a tractor, a semi-trailer truck, a utility or all-terrain vehicle), non-motorized vehicles (e.g., a bicycle), railed vehicles (e.g., a train), watercraft (e.g., a boat), aircraft (e.g., an airplane), spacecraft (e.g., satellite), and the like.

The radar system 104 enables other systems of the vehicle 102 (not shown for simplicity in the drawings) to detect at least one object 106 within vicinity of the vehicle 102, and which may impact how or whether the vehicle 102 can continue to travel. These other systems may be operatively and/or communicatively coupled to the radar system 104 using wired and/or wireless links that act as interconnections, paths, or busses for vehicle inter-component communications. Outputs from the radar system 104 enable their vehicle-based functions, some non-limiting examples of which include a system for autonomous control, a system for safety, a system for localization, a system for vehicle-to-vehicle communication, a system for an occupant interface, and a system for a radar or multi-sensor tracker.

The radar system 104 illuminates a region of interest in the environment 100, which at least partially surrounds the vehicle 102. This region of interest is referred to as a field of view 108, which can also be referred to as an instrumented field of view 108. Careful selection and/or positioning of components of the radar system 104 may cause the field of view 108 to have a particular shape or size. Components of the radar system 104 can be installed on, mounted to, or integrated with any part of the vehicle 102, such as in a front, back, top, bottom, or side portion of the vehicle 102, a bumper, a side mirror, part of a headlight and/or taillight, or at any other interior or exterior location where the object 106 requires detection.

The radar system 104 can emit EM radiation via antenna elements by transmitting waveforms or radar signals 110-1 into the field of view 108. EM radiation that reflects back from the environment 100 can be processed into radar returns 110-2 to determine the position, angle, range-rate, or other characteristics of objects in the environment 100, relative a position and orientation of the vehicle 102. For example, in the environment 100, the radar system 104 can detect and track the object 106 by transmitting the radar signals 110-1 and receiving the radar returns 110-2. As one example, the radar system 104 transmits the radar signals 110-1 between one hundred and four hundred gigahertz (GHz), between four and one hundred GHz, or between approximately seventy and eighty GHz.

The radar system 104 includes a MMIC 112, a processor 114 (e.g., an energy processing unit), a computer-readable media (CRM) 116, and phase shifters 118. Other radar components (e.g., an antenna array) may be used by the radar system 104 but are not shown for simplicity in the drawing. Through the MMIC 112, the processor 114 is operatively coupled to an interface to an antenna array, such as a MIMO array capable of transmitting multiple chirps across a range of frequencies, on multiple transmit and/or receive channels. The MMIC 112, the processor 114, the CRM 116, and/or the polyphase shifters may be operatively and/or communicatively coupled via wired or wireless links (not shown), and may be part of a radar chip, which may be referred to as a system on chip.

The MMIC 112 accumulates radar data from the MIMO array on behalf of the processor 114. The radar data includes information about the position and movement of objects in the field of view 108, such as positions and range-rates of radar detections that reflect off the object 106. The MMIC 112 receives instructions from the processor 114 to indicate a waveform or signal characteristics (e.g., timing, phase, frequency range, channels) of the radar signals 110-1 and their corresponding reflections, i.e., the radar returns 110-2.

The MMIC 112 causes the radar signals 110-1 to be transmitted via the MIMO array and into the environment 100 and then, causes the radar returns 110-2 to be detected and received.

The phase shifters 118 are associated with and operably connected to transceiver components of the MMIC 112. The phase shifters 118 can apply a phase shift to one or more signal pulses of the radar signals 110-1 being transmitted in some applications. In other implementations, the phase shifters 118 can apply a phase shift to one or more signal pulses of the radar returns 110-2 being received. The phase shifters 118 can be binary phase shifters supporting two phase-stages (e.g., to support two transmit channels). The phase shifters 118 can be polyphase shifters that enable the radar system 104 to support more than two phase-stages, for instance, to provide three or more transmit channels.

The processor 114 may include a hardware accelerator, a controller, a control circuit, a microprocessor, its own chip, its own system, its own system-on-chip, a device, a processing unit, a digital signal processing unit, a graphics processing unit, or a central processing unit. The processor 114 may include multiple processors or cores, embedded memory storing executable software or firmware, internal/dedicated/secure cache or any other computer element that enables the processor 114 to execute machine-readable instructions for generating radar outputs. The processor 114 processes the radar data generated by the MMIC 112 in conjunction with the phase shifters 118. The processed radar data is output in a data structure (e.g., one or multiple-dimension array, data cube, detection list, track list), which is usable to perform various radar based functions (e.g., object classification, object tracking). For example, the processor 114 can output the radar data based on processed EM energy to enable an autonomous or semi-autonomous driving system to safety control the vehicle 102 by relying on accurate reporting of objects and their classifications as they move in and out of the vicinity of vehicle 102.

At least a portion of the CRM 116 is configured as a dedicated storage for the processor 114. The CRM 116 may include regions of storage (e.g., memory) reserved by the processor 114 to maintain executable instructions and/or the radar data produced during radar processing. The processor 114 can execute instructions stored in the CRM 116 for executing radar operations. As two examples, the CRM 116 stores instructions for executing radar functions performed by a waveform generator 120 and a mixed-Doppler interval module 122.

In some examples, the processor 114 and at least a portion of the CRM 116 are a single component, such as an embedded system or system on chip. Wen executed, the instructions stored by the CRM 116 configure the processor 114 to analyze EM energy received by the MMIC 112 to determine radar data indicative of a location and/or direction of the object 106 relative the radar system 104. Access to the CRM 116 may be shared by other components of the radar system 104. For example, upon execution by the processor 114 or another processor of the radar system 104, various features (e.g., range, target angle, range rate, velocity) of the object 106 may be detected, and/or the object 106 may be classified as one of various different object types (e.g., truck, pedestrian, animal, car, sign, building). Through execution of instructions maintained on the CRM 116 and/or reliance on programmable logic hardware, the processor 114 may command the MMIC 112 to effect transmit and receive operations of the MMIC 112. Similarly, the processor 114 may execute operations to control the phase shifters 118. That is, the processor 114 can control the MMIC 112, the phase shifters 118, and/or other components of the radar system 104 to configure the radar system 104 to adopt a particular waveform or radar signaling scheme. The radar system 104 can implement the waveform generator 120 and/or the mixed-Doppler interval module 122 as machine-executable instructions stored in the CRM 116, programmed in the MMIC 112 or the processor 114, including using hardware, software, or a combination thereof.

The described radar system 104 can facilitate the simultaneous transmission of multiple transmitter channels using a MIMO waveform generated from applying the described Spatial-Block CDM techniques. This enables multiple transmit channels to be simultaneously supported while providing radar signals with without Doppler ambiguity. Doppler ambiguity can be resolved to generate correct measurements.

The waveform generator 120 enables the radar system 104 to control characteristics of the radar signals 110-1 being transmitted into the field of view 108. This imparts similar characteristics in the radar returns 110-2 being received as reflections from the field of view 108. In particular, the waveform generator 120 can control a phase shift applied or introduced at each channel. The phase shift may be different from one slot to the next. The phase shift can be the same from one slot to the next. The waveform generator 120 can operate the radar system 104 and control the phase shifters 118 to cause a desired pattern in the radar signals 110-1 including causing a unique pattern of phase shifts across slots of each spatial block. In this way, the waveform generator 120 can operate components of the radar system 104 to perform Spatial-Block CDM transmission techniques.

The mixed-Doppler interval module 122 allows for ambiguity in the received radar returns 110-2 to be resolved among multiple receive channels. In particular, the mixed-Doppler interval module 122 can resolve reflections of EM signals transmitted using Spatial-Block CDM techniques. This enables the mixed-Doppler interval module 122 to detect when a situation is likely to cause ambiguity among two or more channels due to Doppler effects from sampling slots of each spatial block at different times when targets are moving. In some examples, the mixed-Doppler interval module 122 flags radar data obtained by the radar system 104 to indicate that a mixed-Doppler interval condition exists and that the radar data is not reliable for velocity estimations. In other examples, possible errors or ambiguity that is caused by Doppler effects from moving targets can be compensated by the mixed-Doppler interval module 122. In this way, more accurate radar data that is free from errors due to Doppler effects is provided by the radar system 104.

Example Vehicle Configuration

Figure 2:
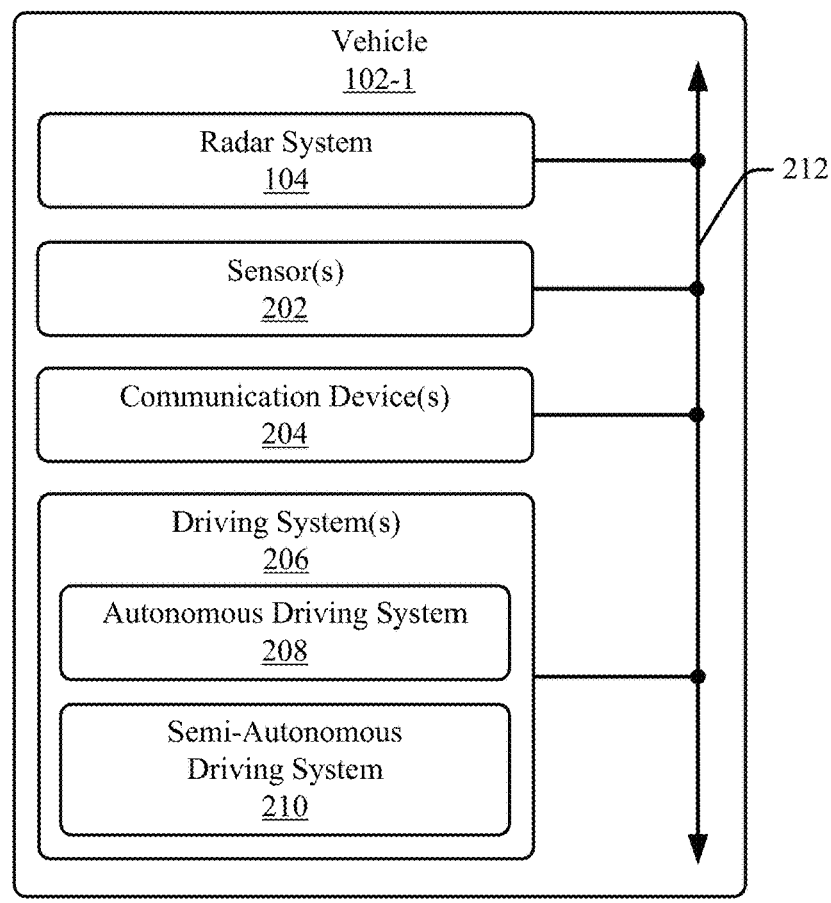
FIG. 2 illustrates an example vehicle configuration using a radar system that executes Spatial-Block CDM for MIMO waveforms, in accordance with techniques of this disclosure.

FIG. 2 illustrates an example vehicle configuration 200 using a radar system that executes Spatial-Block CDM for MIMO waveforms, in accordance with techniques of this disclosure. A vehicle 102-1, which is an example of the vehicle 102, relies on the radar system 104 to generate radar data. In addition, the vehicle 102-1 includes other sensors 202, communication devices 204, and driving systems 206, which include an autonomous driving system 208 or semi-autonomous driving system 210. The radar data from the radar system 104 can be used by the sensors 202, the communication devices 204, and/or the driving systems 206, to control operations of the vehicle 102-1. The vehicle 102-1 can include many other systems that interface with the radar system 104 to perform radar based vehicle functions.

The sensors 202 can include a location sensor, a camera, a lidar system, or a combination thereof. The location sensor, for example, can include a positioning system that can determine the position of the vehicle 102-1. The camera system can be mounted on or near the front of the vehicle 102-1. The camera system can take photographic images or video of a roadway. In other implementations, a portion of the camera system can be mounted into a rear-view mirror of the vehicle 102-1 to have the field-of-view 108 of the roadway. In yet other implementations, the camera system can project the field-of-view 108 from any exterior surface of the vehicle 102-1. For example, vehicle manufacturers can integrate at least a part of the camera system into a side mirror, bumper, roof, or any other interior or exterior location where the field-of-view 108 includes a roadway. The lidar system can use electromagnetic signals to detect the object 106 (e.g., other vehicles) on the roadway. Data from the lidar system can provide an input to the radar system 104. For example, the lidar system can determine the traveling speed of a vehicle in front of the vehicle 102-1 or nearby vehicles traveling in the same direction as the vehicle 102-1, which can be used by the radar system 104 to generate more accurate radar data for the objects 106 detected in the field of view 108.

The communication devices 204 can be radio frequency (RF) transceivers to transmit and receive RF signals. The transceivers can include one or more transmitters and receivers incorporated together on the same integrated circuit (e.g., a transceiver integrated circuit) or separately on different integrated circuits. The communication devices 204 can be used to communicate with remote computing devices (e.g., a server or computing system providing navigation information or regional speed limit information), nearby structures (e.g., construction zone traffic signs, traffic lights, school zone traffic signs), or nearby vehicles. For example, the vehicle 102-1 can use the communication devices 204 to wirelessly exchange information with nearby vehicles using vehicle-to-vehicle (V2V) communication. The vehicle 102-1 can use V2V communication to obtain the speed, location, and heading of nearby vehicles. Similarly, the vehicle 102-1 can use the communication devices 204 to wirelessly receive information from nearby traffic signs or structures to indicate a temporary speed limit, traffic congestion, or other traffic-related information.

The communication devices 204 can include a sensor interface and a driving system interface. The sensor interface and the driving system interface can transmit data over a communication bus 212 of the vehicle 102-1, for example, between the radar system 104 and the driving systems 206.

Generally, the automotive systems use radar data provided by the radar system 104 to perform a function. For example, the driver-assistance system can provide blind-spot monitoring and generate an alert that indicates a potential collision with the objects 106 that is detected by the radar system 104. The radar data from the radar system 104 indicates when it is safe or unsafe to change lanes in such an implementation. The autonomous-driving system may move the vehicle 102 to a particular location on a roadway while avoiding collisions with the objects 106 detected by the radar system 104. The radar data provided by the radar system 104 can provide information about the distance to and the location of the objects 106 to enable the autonomous-driving system to perform emergency braking, perform a lane change, or adjust the speed of the vehicle 102.

The vehicle 102 can also include at least one automotive system that relies on data from the radar system 104, such as a driver-assistance system, an autonomous-driving system, or a semi-autonomous-driving system. The driving system 206 is an example of such an automotive system. The radar system 104 can include an interface to an automotive system that relies on the data. For example, via the interface, the processor 114 outputs a signal based on EM energy from the radar returns 110-2.

The driving system 206, such as the autonomous driving system 208 or the semi-autonomous driving system 210, relies on data from the radar system 104 to control the operation of the vehicle 102-1 (e.g., set the driving speed or avoid the objects 106). Generally, the driving systems 206 use data provided by the radar system 104 and/or the sensors 202 to control the vehicle 102-1 and perform certain functions. For example, the semi-autonomous driving system 210 can provide adaptive cruise control and dynamically adjust the travel speed of the vehicle 102-1 based on the presence of the object 106 in front of the vehicle 102-1. In this example, the data from the radar system 104 can identify the object 106 and its speed in relation to the vehicle 102-1.

The autonomous driving system 208 can navigate the vehicle 102-1 to a particular destination while avoiding the object 106 as identified by the radar system 104. The data provided by the radar system 104 about the object 106 can provide information about the location and/or speed of the object 106 to enable the autonomous driving system 208 to adjust the speed of the vehicle 102-1.

Example Radar Configurations

Figures 1, 3:
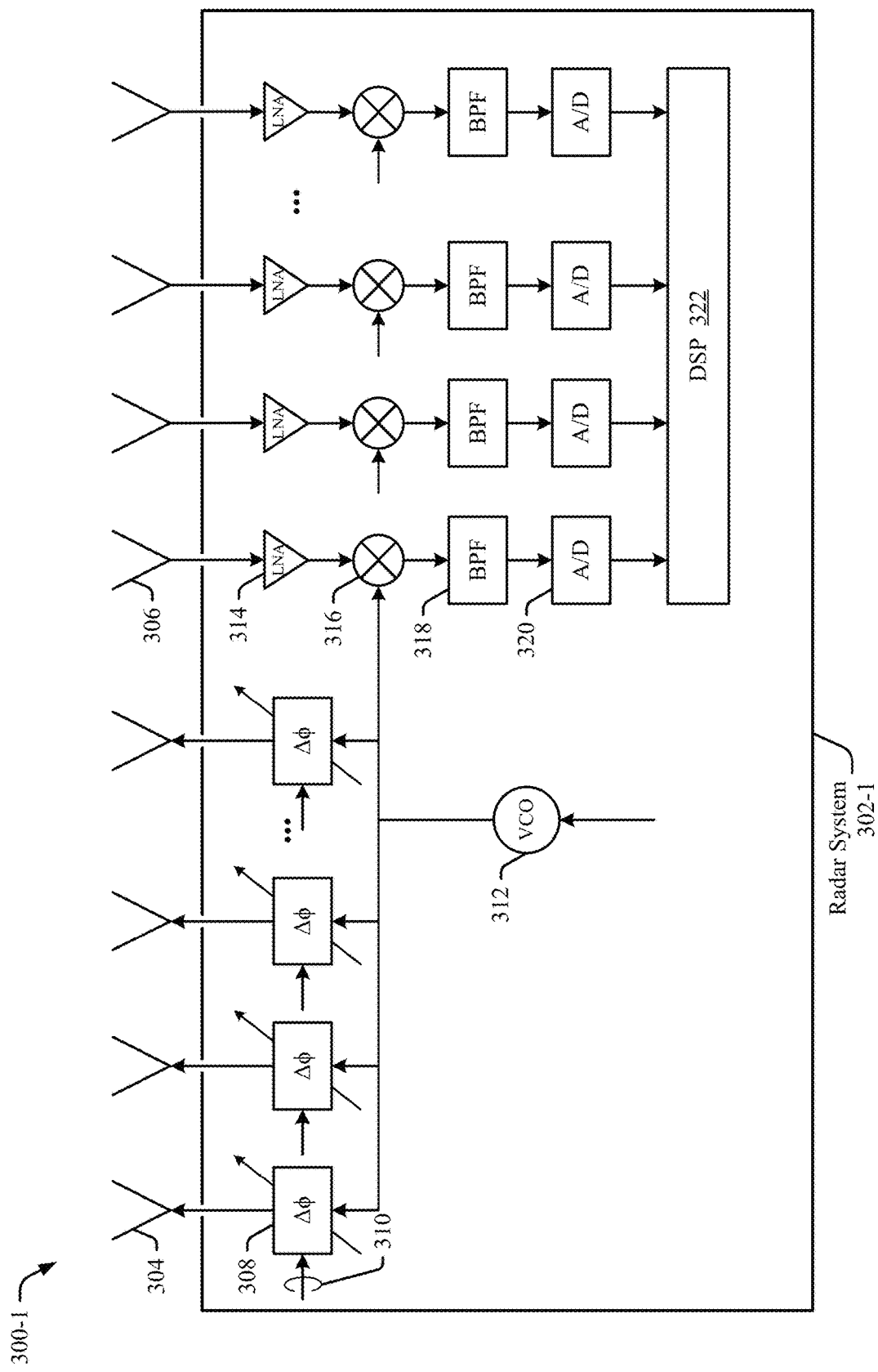
Figures 2, 3:
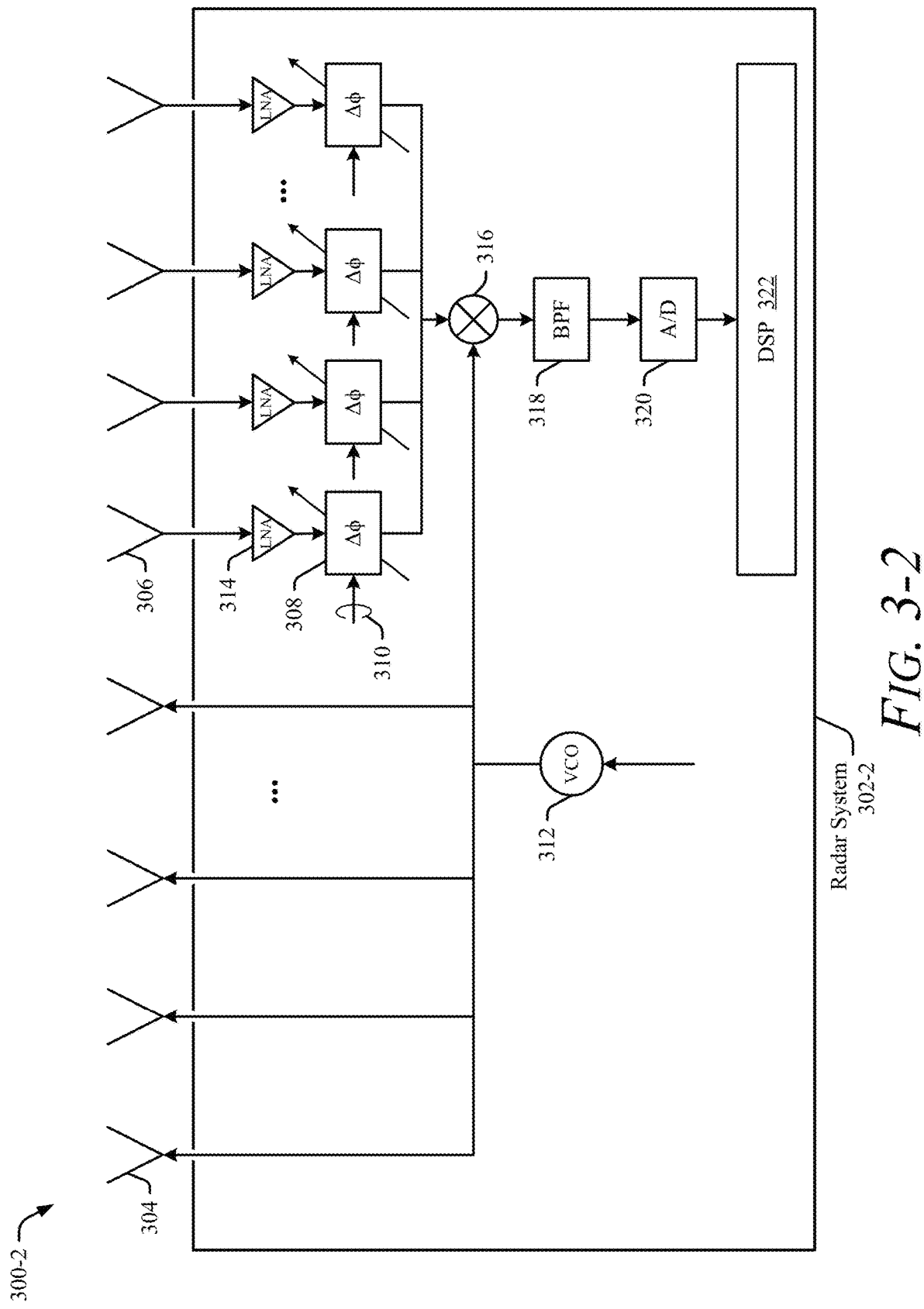
Figure 3:
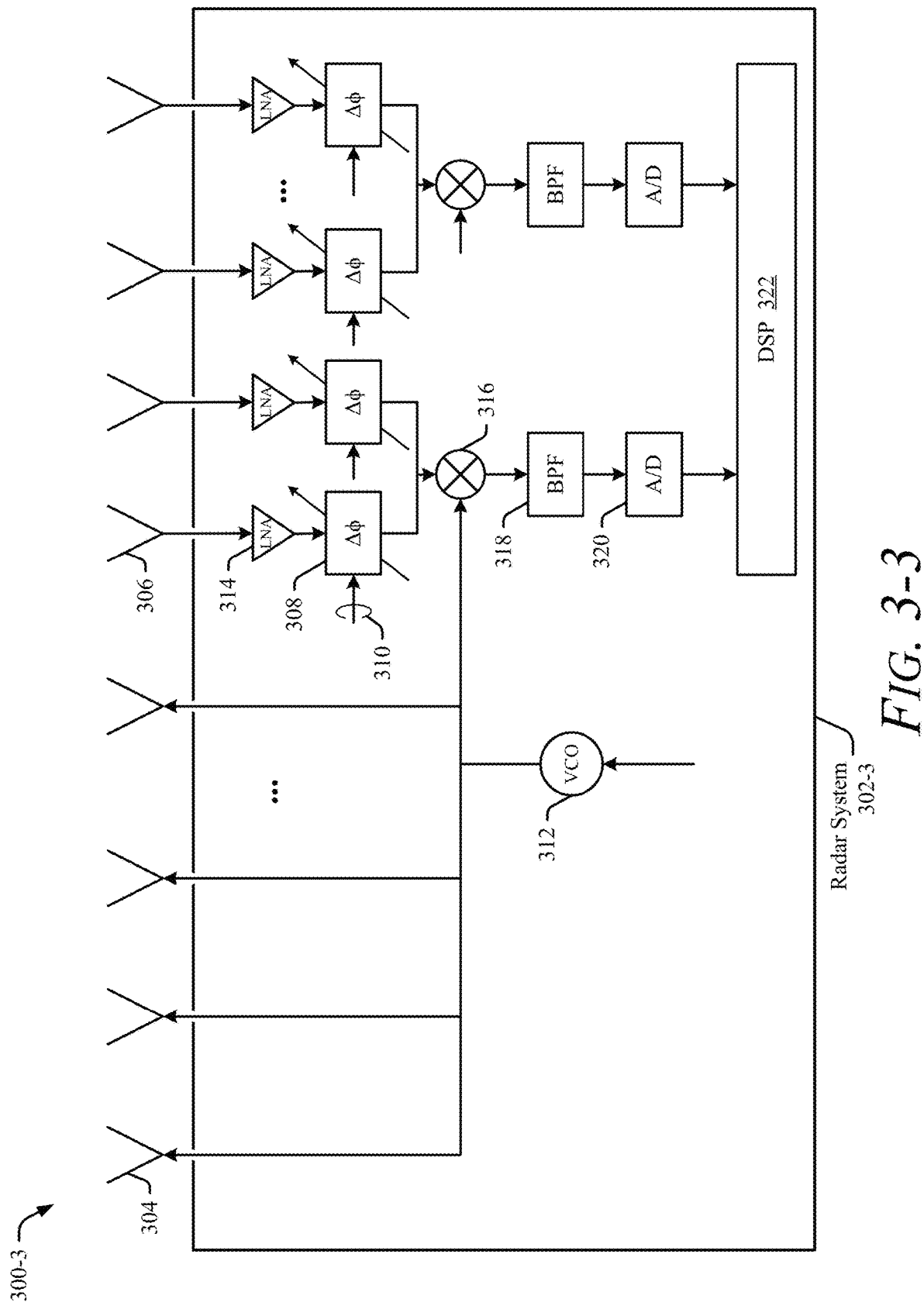

FIGS. 3-1, 3-2, and 3-3 illustrate example conceptual diagrams of a radar system that uses Spatial-Block CDM for MIMO waveforms, in accordance with techniques of this disclosure. FIGS. 3-1 to 3-3 illustrate example conceptual diagrams 300-1, 300-2, and 300-3 of, respectively, radar systems 302-1, 302-2, and 302-3 (collectively radar systems 302). The radar systems 302 are each configured to apply Spatial-Block CDM for MIMO waveforms using different hardware configurations. The radar systems 302 are examples of the radar system 104. The conceptual diagrams 300-1, 300-2, and 300-3 each illustrate distinct components of the radar systems 302, but some or all of these components may be combined into a different (e.g., larger, smaller) set of distinct components.

In the implementation depicted in FIG. 3-1, the radar system 302-1 includes multiple transmitters 304, which are illustrated as antenna elements in this example, configured to transmit respective EM signals. The radar system 302-1 uses the transmitted EM signals to detect any objects 106 in the vicinity of the vehicle 102, and which are within a field-of-view 108. The transmitters 304 can transmit a linear frequency-modulated signal (e.g., chirping signal) in some implementations. In other implementations, the transmitters 304 can transmit a phase-modulated continuous wave (PMCW) signal or a pulse signal (e.g., unmodulated signal). The transmitted EM signals can be any viable signal used for radar. The radar system 302-1 also includes multiple receivers 306, which are illustrated as antenna elements in this example, configured to receive reflected EM signals reflecting by the objects 106.

The radar system 302-1 includes a processor and CRM, which can be the processor 114 and the CRM 116 of FIG. 1. The CRM of the radar system 302-1 can maintain instructions that, when executed by the processor of the radar system 302-1, cause that processor to control the transmitters 304 or phase shifters 308. For example, the processor of the radar system 302-1 can use the waveform generator 120 to control the phase shift applied or introduced to the transmitted EM signals.

The radar system 302-1 also includes a voltage-controlled oscillator (VCO) 312 operatively coupled to the transmitters 304. The VCO 312 provides the basis or reference signal for EM signals transmitted by the transmitters 304. The multiple polyphase shifters 308 are respectively associated with the transmitters 304 and coupled to the transmitters 304 and the VCO 312. In the depicted implementation, a phase shifter 308 is operatively coupled to each transmitter 304. In other implementations, a phase shifter 308 can be operatively coupled to fewer than each transmitter 304.

The polyphase shifters 308 are an example of the phase shifters 118. A phase shift applied or introduced to one or more EM signal pulses transmitted by the transmitters 304 can be controlled using these polyphase shifters 308. Each of the polyphase shifters 308 has multiple potential output stages (e.g., 4, 8, 16, 32, 64, 128, or 256 stages). For example, the processor of the radar system 302-1 can provide a polyphase control signal 310 to the polyphase shifters 308 to control or set the phase stage of each polyphase shifter 308. The polyphase control signal 310 can be a multiple-bit signal (e.g., 6-bit, 8-bit, 12-bit, 16-bit, 24-bit, or 32-bit), allowing the polyphase shifters 308 to have more than two phase stages. For example, a six-bit polyphase shifter 308 has up to 64 potential phase stages. The increased number of potential phase stages provides more flexibility (e.g., than binary phase shifters can provide) in Spatial-Block CDM schemes applied by the radar system 302-1. The polyphase control signal 310 can add a progressive phase modulation $\phi$ to the transmitted EM signal pulses, which asymmetrically shifts the frequency or Doppler frequency of the reflected EM signals by an offset frequency $\omega_c$, which is equal to the product of two, pi, and the phase modulation (e.g., $\omega_c = 2\pi\phi$).

The receivers 306 of the radar system 302-1 are configured to receive reflected EM signals. The radar system 302-1 processes the received EM signals to make one or more determinations regarding objects 106 within the field-of-view 108 of the radar system 302-1. The receivers 306 are operatively coupled to respective low noise amplifiers (LNAs) 314. The LNAs 314 can amplify the received EM signal without significant degradation to the signal-to-noise ratio. The LNAs 314 are operatively coupled to respective mixers 316, which are coupled to the VCO 312. The output of the VCO 312 serves as a reference signal and combines with the respective received EM signals in the mixers 316. The radar system 302-1 passes the respective received EM signals through band-pass filters (BPFs) 318 and analog-to-digital converters (ADCs) 320 before analyzing them with a digital signal processor (DSP) 322. The DSP 322 can make one or more determinations regarding the objects 106, including resolving Doppler ambiguities. The BPFs 318 can pass frequencies in the received EM signals within a specific range and reject or attenuate frequencies outside this range. In other implementations, the radar system 302-1 can use additional or different filters, including low-pass filters or high-pass filters. The ADCs 320 converts the analog EM signals into a digital signal. The DSP 322 can use mixed-Doppler interval module to detect and/or resolve Doppler ambiguities in radar data used to identify the objects 106. Although the DSP 322 is illustrated as a separate component from the processor, the radar system 302-1 can include a single processor that controls the transmission of EM signals and makes determinations from the reception of EM signals.

In the conceptual diagrams 300-1 and 300-2 depicted in FIG. 3-1 and FIG. 3-2, respectively, the radar systems 302-2 and 302-3 can include similar components as depicted for the radar system 302-1. For example, the radar systems 302-2 and 302-3 include the transmitters 304, receivers 306, a processor, CRM, polyphase shifters 308, VCO 312, LNAs 314, the mixer 316, the BPF 318, the ADC 320, and the DSP 322. The polyphase shifters 308 are operatively coupled to the LNAs 314 and the mixer 316 in the receiver paths of the radar systems 302-2 and 302-3 to asymmetrically shift the frequency or Doppler frequency of the reflected EM signals. In FIG. 3-2, the polyphase shifters 308 are operatively coupled to each receive channel and then operatively coupled to a single down-conversion or analog-to-digital conversion channel. In FIG. 3-3, the polyphase shifters 308 are operatively coupled to each receive channel and a subset of the receive channels or polyphase shifters 308 are then operatively coupled to a down-conversion or analog-to-digital conversion channel. As illustrated in the conceptual diagram 300-3, the radar system 302-3 includes two polyphase shifters 308 or receive channels per down-conversion or analog-to-digital conversion channel. In other implementations, the radar system 302-3 can include another number of polyphase shifters 308 or receive channels per down-conversion or analog-to-digital conversion channel, resulting in N receive groups with M receive channels per receive group.

The polyphase shifters 308 can also be operatively coupled in between other components in the receiver paths, including between the receivers 306 and the LNAs 314. The polyphase shifters 308 are not operatively coupled to the transmitters 304 but instead respectively associated with the receivers 306. The polyphase shifters 308 can introduce or apply an asymmetrical phase shift to the received EM signals. The radar system 302-2 or 302-3 can combine (e.g., superimpose) the signals received by one or more of the receivers 306 prior to analog-to-digital conversion by the ADC 320.

As described above, each polyphase shifter 308 has multiple potential output stages (e.g., 4, 8, 16, 32, 64, 128, or 256 stages). For example, the processor of the radar systems 302-2 or 302-3 can provide the polyphase control signal 310 to the polyphase shifters 308 to control or set the phase stage of each polyphase shifter 308. The polyphase control signal 310 can be a multiple-bit signal (e.g., 6-bit, 8-bit, 12-bit, 16-bit, 24-bit, or 32-bit), giving the polyphase shifters 308 more than two phase stages. The increased number of potential phase stages provides more flexibility in an FDM coding scheme applied by the radar system 302-2 to the received EM signals than binary phase shifters can provide. The polyphase control signal 310 can add a progressive phase modulation $\phi$ to the received EM signal pulses, which asymmetrically shifts the frequency or Doppler frequency of the reflected EM signals by an offset frequency $\omega_c$, which is equal to the product of two, pi, and the phase modulation (e.g., $\omega_c=2\pi\phi$).

Example Waveforms

FIGS. 4, 5, 6, and 7 each illustrate graphical representations of example MIMO waveforms for a radar system using Spatial-Block CDM, in accordance with techniques of this disclosure. For example, the radar system 104 and/or the radar systems 302 can adopt any of the waveforms, or adaptions thereof, to detect mixed-Doppler intervals, resolve ambiguity, and/or perform analog beamforming. These example waveforms may be modified and/or used as basis for more complex waveforms. Through their adoption, the example waveforms enable transmission and/or reception of EM signals for implementing different variations of Spatial-Block CDM.

Figure 4:
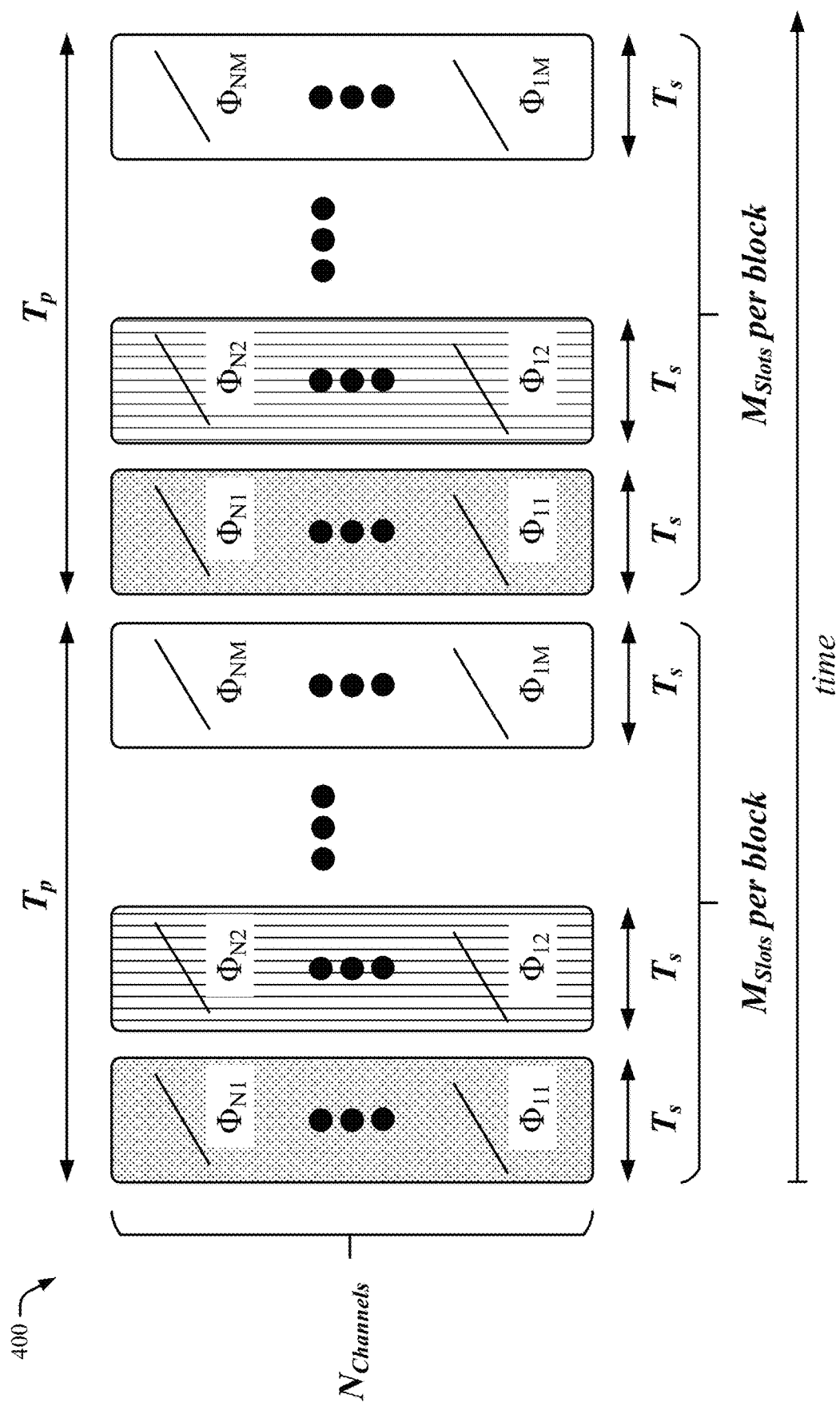
FIGS. 4, 5, 6, and 7 each illustrate graphical representations of example MIMO waveforms for a radar system using Spatial-Block CDM, in accordance with techniques of this disclosure.

FIG. 4 illustrates a graphical representation of a MIMO waveform 400 that can generally be used for mixed-Doppler interval detection and resolving velocities using Spatial-Block CDM techniques. The waveform 400 supports a MIMO radar system having a quantity N of channels. Each of the channels simultaneously transmits a corresponding radar signal $s_1, \ldots, s_N$. FIG. 4 shows two spatial blocks, each having a duration $T_p$ and being evenly divided into a quantity M of slots. M is chosen to be greater than N. The quantity M of the slots can be greater than the quantity N of the channels by one; in other cases, the quantity M of the slots is greater than the quantity N of the channels by more than one. Each slot has the same duration $T_s$. Given this, $T_s$ multiplied by M produces $T_p$.

All N channels are activated with a pre-defined phase shift that can vary depending on slot. According to this example, the waveform 400 supports a signal that has a pre-defined phase shift $\Phi_{ij}$, where i is the channel (e.g., ranging one to N) and j is the slot (e.g., ranging one to M). For example, during a first slot, channel 1 is activated with a phase shift $\Phi_{11}$ and channel N is activated with a phase shift $\Phi_{N1}$. During a second slot, channel 1 is activated with a phase shift $\Phi_{12}$ and channel N is activated with a phase shift $\Phi_{N2}$. This repeats until finally, during slot M, channel 1 is activated with a phase shift $\Phi_{1M}$ and channel N is activated with a phase shift $\Phi_{NM}$.

Upon reception of reflections of the waveform 400, a set of M complex observations are obtained for each Doppler bin by applying a FFT across a combination of the N channels at each of the M slots. For example, Y is a set including elements $y_1, y_2, \ldots, y_M$, each of which represent a complex observations from one of the M FFTS applied at one Doppler bin, and $v_p$ is the measured Doppler from applying an FFT across that spatial block. Next, let s be a set including elements $s_1, s_2, \ldots, s_N$ represent the complex signal amplitude of the N channels at the same Doppler bin. Then, Equation 5 can be applied to detect whether each spatial block has a mixed-Doppler interval.

$$\begin{bmatrix} e^{j\Phi_{1,1}} & \ldots & e^{j\Phi_{N,1}} \\ \vdots & \ddots & \vdots \\ e^{j\Phi_{1,M}} & \ldots & e^{j\Phi_{N,M}} \end{bmatrix} \cdot \begin{bmatrix} s_1 \\ \vdots \\ s_N \end{bmatrix} = \begin{bmatrix} y_1 e^{-j(1-1)\theta} \\ \vdots \\ y_M e^{-j(M-1)\theta} \end{bmatrix}. \qquad \text{Equation 5}$$

In Equation 5, the term $\theta$ is the phase introduced by Doppler effects between two of the M slots. This phase $\theta$ is represented by Equation 6:

$$\theta = 2\pi\left(-\frac{2v_s}{\lambda}\right)t_s. \qquad \text{Equation 6}$$

To help understand clearer, Equation 5 can be rewritten in vector form, as shown in Equation 7:

$$Qs = Y\alpha(\theta) \qquad \text{Equation 7.}$$

In Equation 7, the term Q is equal to $$\begin{bmatrix} e^{j\Phi_{1,1}} & \ldots & e^{j\Phi_{N,1}} \\ \vdots & \ddots & \vdots \\ e^{j\Phi_{1,M}} & \ldots & e^{j\Phi_{N,M}} \end{bmatrix},$$

and $\alpha(\theta)$ is equal to $$\begin{bmatrix} e^{-j(1-1)\theta} \\ \vdots \\ e^{-j(M-1)\theta} \end{bmatrix}.$$

From rearranging terms, Equation 8 is provided, which solves for s:

$$s = Q^\dagger Ya(\theta) \quad \text{Equation 8.}$$

In Equation 8, where $Q^H$ is the Hermitian transpose of Q, the term $Q^\dagger$ is defined by Equation 9:

$$Q^\dagger = (Q^H Q)^{-1} Q^H \quad \text{Equation 9.}$$

Error as a function of the phase θ can then be expressed as Equation 10:

$$\epsilon(\theta) = Ya(\theta) - QQ^\dagger Ya(\theta) \quad \text{Equation 10.}$$

The error function ϵ(θ) can be simplified as shown in Equation 11:

$$\epsilon(\theta) = P^\perp_Q Ya(\theta) \quad \text{Equation 11.}$$

In Equation 11, the term $P^\perp_Q$ is the orthogonal projection of Q, and is defined by Equation 12:

$$P^\perp_Q = I - Q(Q^H Q)^{-1} Q^H \quad \text{Equation 12.}$$

A square error function $\epsilon^2(\theta)$ can be defined by Equation 13:

$$\epsilon^2(\theta) = (P^\perp_Q Ya(\theta))^H P^\perp_Q Ya(\theta) = a^H(\theta) Y^H P^\perp_Q Ya(\theta) \quad \text{Equation 13.}$$

The term $P^\perp_Q$ can be pre-computed using Equation 12. This way, because $T_p$ is equal to M multiplied by $T_s$, Equation 13 can be used to provide, from a measured velocity $v_p$, M possible values of the velocity $v_s$. As such, by assuming there can be M corresponding phase offsets $\theta_1, \ldots, \theta_M$ introduced by the M possible values of $v_s$, a correct phase offset θ can be found from Equation 14:

$$\operatorname{argmin} \epsilon^2(\theta) \quad \text{Equation 14}$$

$$\theta \in \{\theta_1, \ldots, \theta_M\}.$$

After a correct phase offset θ is obtained from Equation 14, Equation 8 can be solved using the determined phase offset θ to reconstruct the signals s.

Using the above derivations, the radar system 104 and/or the radar systems 302 can detect whether a mixed-Doppler interval occurs during each spatial block. For example, the mixed-Doppler interval module 122 can determine, based on the complex observations Y, whether a Doppler phase shift between two of the M slots has a single possible value for the phase offset θ or multiple possible values for the phase offset θ. In cases where the result of Equation 14 produces more than one possible phase offset θ, a mixed-Doppler interval condition exists. In other words, when two or more targets fall into a same Doppler bin (e.g., have an aliased Doppler value $v_p$ representing mixed parity) but different values for $v_s$, then a mixed-Doppler interval is determined to have occurred. There is no single phase offset θ that can correct the Doppler phase shift in the M observations of Y (e.g., $y_1, \ldots, y_M$). Responsive to determining that the Doppler phase shift between two of the slots has multiple possible values, the mixed-Doppler interval module 122 may output an indication of a mixed Doppler interval detected in that spatial block.

In other cases, the mixed-Doppler interval module 122 can determine whether a mixed-Doppler interval occurs even if a single possible value for the phase offset θ can be derived from Equation 14. Because the square error function $\epsilon^2(\theta)$ produces a term that is related to signal to noise ratio, a mixed-Doppler interval can be detected by evaluating a minimum square error obtained from Equation 14. Assuming $\epsilon^2_{min}$ is a minimum error, it can be compared against a threshold to determine whether a mixed-Doppler interval is detected. The threshold can be based on the signal to noise ratio. For example, if the minimum error $\epsilon^2_{min}$ is too high (e.g., larger than the threshold), then the minimum error $\epsilon^2_{min}$ satisfies a mixed interval threshold for indicating a possible mixed-Doppler interval during that spatial block. For example, responsive to determining that the Doppler phase shift between two of the slots has a single possible value, the mixed-Doppler interval module determines whether a minimum error caused by the Doppler phase shift of the single possible value satisfies a mixed interval threshold. An indication of a mixed-Doppler interval detected in that spatial block can be output by the mixed-Doppler interval module 122 in response to determining that the minimum error satisfies the mixed interval threshold.

Figure 5:
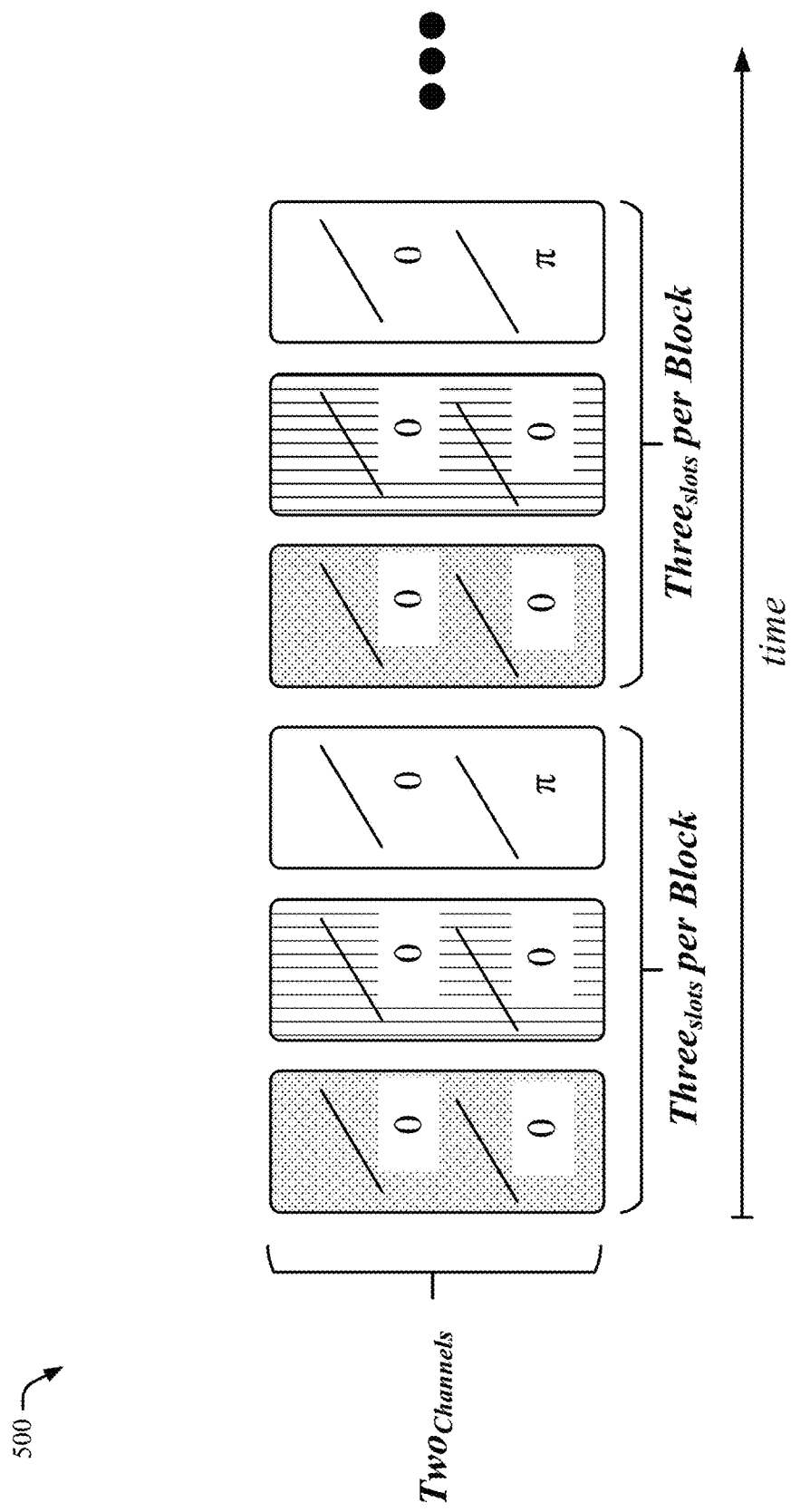

FIG. 5 illustrates a graphical representation of a MIMO waveform 500 for MIMO radar systems having a quantity of two channels. Each of the two channels (e.g., channel 1 and channel 2) simultaneously transmits a corresponding radar signal (e.g., $s_1$ or $s_2$) for the duration of each spatial block. Two spatial blocks are illustrated in FIG. 5; each spatial block is evenly divided into three slots, which satisfies conditions for resolving velocities using Spatial-Block CDM because the three slots represents a greater quantity than the two channels. The radar system 104 and/or the radar systems 302 can apply Spatial-Block CDM techniques by defining the waveform 500 as follows: Q is equal to $$\begin{bmatrix} 1 & 1 \\ 1 & 1 \\ 1 & -1 \end{bmatrix},$$

s is equal to $$\begin{bmatrix} s_1 \\ s_2 \end{bmatrix},$$

and Y is equal to $$\begin{bmatrix} y_1 \\ y_2 e^{-j\theta} \\ y_3 e^{-j2\theta} \end{bmatrix}.$$

In this example, the middle slot has a code that is a repeat of a code of the first slot. The last slot has a different code than the first and second slots.

With the waveform generator 120 causing transmissions of the waveform 500, and with the mixed-Doppler interval module 122 evaluating reflections to the waveform 500, mixed-Doppler intervals can be detected, and velocities can be resolved without ambiguity. For example, the waveform generator 120 can operate the MMIC 112 to produce the waveform 500. Because the radar system 104 is a MIMO system, non-coherent integration of the reflections is required to be performed across all dimensions of an antenna array in order to identify detections. Non-coherent integration can be performed in various ways.

Spatial-Block CDM techniques to detect or resolve mixed-Doppler intervals can be applied before or after this non-coherent integration process occurs. That is, the complex observations may be associated with each of the range and Doppler measurements inferred prior to performing non-coherent integration across all channels. For example, a more complex process for implementing the square error function $\epsilon^2(\theta)$ involves using all the original complex observations Y, not just those associated with detections. The square error function $\epsilon^2(\theta)$ is solved for every range and Doppler bin, before non-coherent integration. In other cases, to reduce complexity, the complex observations only include those associated with detections inferred after performing non-coherent integration across all channels. A different implementation (which may be faster and/or less complex) pairs the complex observations Y down to only include those associated with detections inferred after range and Doppler processing. Applying the square error function $\epsilon^2(\theta)$ after applying non-coherent integration can simplify its solution; solutions to the square error function $\epsilon^2(\theta)$ only need to be found for a subset, as opposed to all, of the complex observations obtained. This implementation supports generation of analog beams that point at different angles during each slot to improve gain of the non-coherent integration at those angles. The gain is different depending on whether the square error function $\epsilon^2(\theta)$ is solved before non-coherent integration, or whether the square error function $\epsilon^2(\theta)$ is solved after, utilizing benefits of the analog beam formations.

Continuing to focus on the waveform 500, consider an example of the radar system 104 to include a MIMO antenna array that has a one half wavelength spacing between its two transmit elements. Other spacings can be used to change antenna shape without effecting non-coherent integration gain. In each of the three slots, the radar system 104 forms a particular analog beam. The specific code of phase shifts applied by the phase shifters across the channels during each slot forms an analog beam directed at a particular angle. To improve gain, the analog beam formed during two or more of the slots can be directed at a same angle. To resolve ambiguity, the analog beam formed during at least one other of the slots is directed at a different angle than the analog beam formed during the two or more of the slots at the same angle. For example, the first two slots can have an analog beam pointing at zero degrees, and the third slot may have a beam with a null at zero degrees but higher gains at other angles.

After transmitting multiple (e.g., one thousand) spatial blocks including three times as many pulses or slots, and with reference to one channel at zero degrees, benefits of the analog beam formations with regard to improved non-coherent integration gain are clear. In this specific two channel example, with reference to one channel at zero degrees, if the square error function $\epsilon^2(\theta)$ is resolved for the two channels before non-coherent integration occurs, the gain is approximately 7.1 dB. This gain is based on 4.7 dB from the three thousand pulses and 2.4 dB from the non-coherent integration over the two channels. However, the gain may be improved if analog beam formations are adopted and the square error function $\epsilon^2(\theta)$ is resolved after non-coherent integration occurs.

With reference to one channel at zero degrees, the gain of this two channel example from resolving the square error function $\epsilon^2(\theta)$ after non-coherent integration occurs is approximately 8 dB and may be more. This is at least 0.9 dB more than if no analog beamforming occurs. The 8 dB or more of gain is based on 6 dB from the power of the two channels and the coherently integrated beam, 3.7 dB from the non-coherent integration over the three slots, and −1.7 dB because one channel has no gain.

A highest gain from analog beamforming this way is not at zero degrees but at approximately plus or minus 17.8 degrees, which is where the three analog beams intercept. Between plus or minus 44.68 degrees, the non-coherent integration gain through this implementation is higher or equal to the gain obtained when the square error function $\epsilon^2(\theta)$ is resolved before non-coherent integration occurs. Through analog beamforming with this type of MIMO waveform, the radar system 104 may realize a higher gain across a wide range of the field of view 108. Consistent, but lower gain is realized, when analog beamforming is not used.

Figure 6:
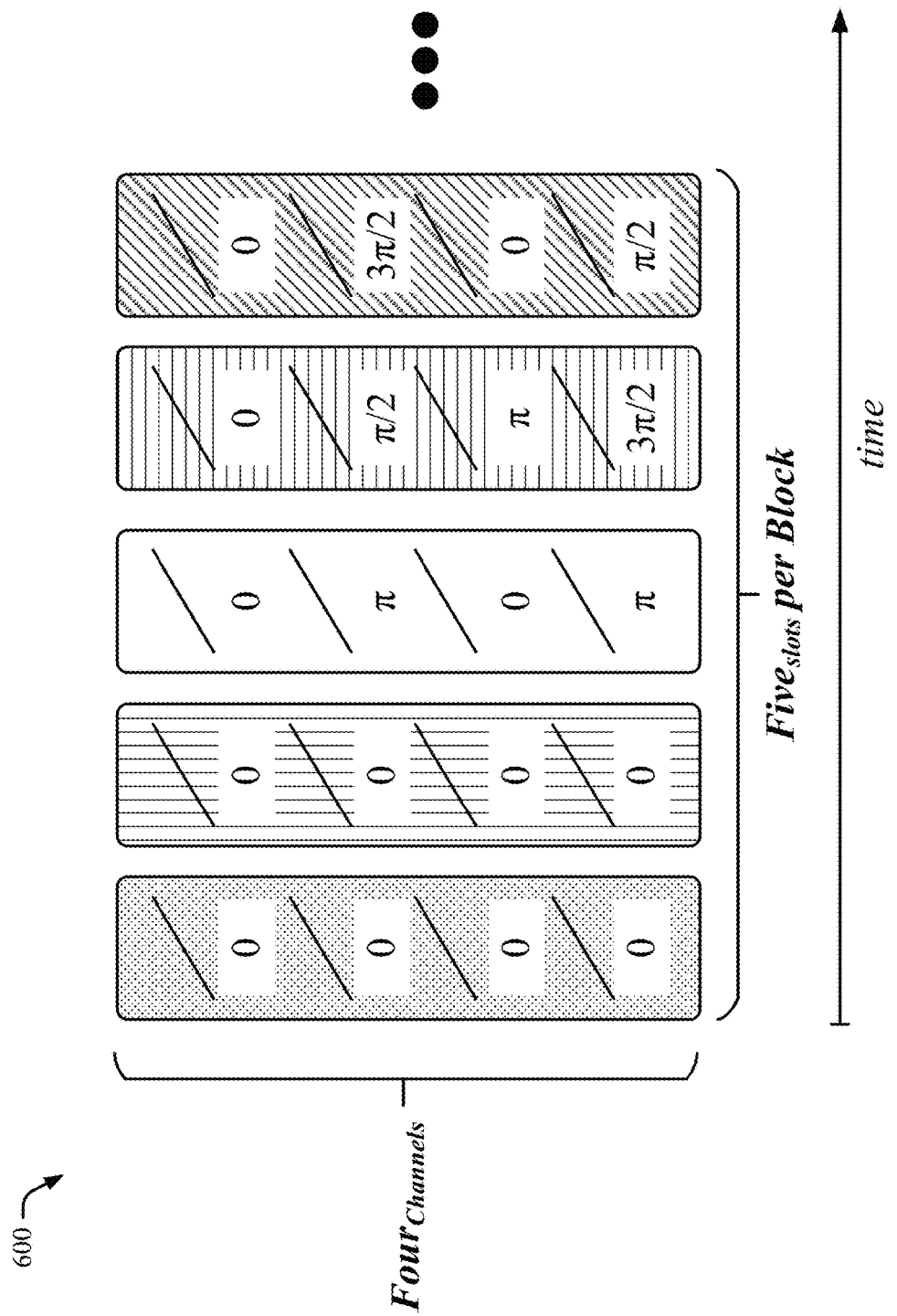

FIG. 6 illustrates a graphical representation of a MIMO waveform 600 for MIMO radar systems having a quantity of four channels. The waveform 500 can be generated when the phase shifters 118 are binary shifters. In contrast, the radar system 104 uses polyphase shifters as the phase shifters 118 when generating a waveform like the waveform 600. In generating the waveform 600, each of the four channels of the radar system 104 simultaneously transmits a corresponding radar signal (e.g., $s_1$, $s_2$, $s_3$, $s_4$) for the duration of each spatial block. A single spatial block is illustrated in FIG. 6; each spatial block is evenly divided into five slots, which satisfies conditions for resolving velocities using Spatial-Block CDM because the five slots represent at least one more than the four channels. The radar system 104 and/or the radar systems 302 can apply Spatial-Block CDM techniques by defining the waveform 600 as follows: Q is equal to $$\begin{bmatrix} 1 & 1 & 1 & 1 \\ 1 & 1 & 1 & 1 \\ 1 & -1 & 1 & -1 \\ 1 & j & -1 & j \\ 1 & -j & 1 & j \end{bmatrix},$$

s is equal to $$\begin{bmatrix} s_1 \\ s_2 \\ s_3 \\ s_4 \end{bmatrix},$$

and Y is equal to $$\begin{bmatrix} y_1 \\ y_2 e^{-j\theta} \\ y_3 e^{-j2\theta} \\ y_4 e^{-j3\theta} \\ y_5 e^{-j4\theta} \end{bmatrix}.$$

In this example, the second slot has a code that is a repeat of a code of the first slot. The third, fourth, and fifth slots each have a unique code, different than the other slots. The polyphase shifters allow the waveform 600 to be generated by the radar system 104, which can provide great flexibility in forming analog beams pointed at a variety of different angles (e.g., four different angles in this example). Many different phase combinations can be provided with four channels, specific phase codes may be used depending on application.

Different phase combinations can lead to different analog beam shapes. For example, Equation 15 shows how M beams may be formed at M possible angles $\Phi_1, \ldots, \Phi_M$:

$$\begin{bmatrix} b(\Phi_1) \\ \vdots \\ b(\Phi_M) \end{bmatrix} \cdot \begin{bmatrix} s_1 \\ \vdots \\ s_N \end{bmatrix} = \begin{bmatrix} y_1 e^{-j(1-1)\theta} \\ \vdots \\ y_M e^{-j(M-1)\theta} \end{bmatrix}.$$ Equation 15

Use of a random of pseudo random phase combinations are also possible. In such a case, the square error function $\epsilon^2(\theta)$ is resolved before non-coherent integration occurs because random phase may not form any particular analog beams.

It is worth mentioning that to obtain sufficient complex observations to support analog beamforming with MIMO waveforms, Q is set to have sufficient rows to support the N channels, however, the quantity of columns for Q need be greater than the N channels. In addition, implementations in which analog beams are formed that are directed at similar (e.g., close) angles, it is possible that a value of $(Q^H Q)^{-1}$ is small. As this determinant value approaches zero, resolving the square error function $\epsilon^2(\theta)$ becomes difficult.

Figure 7:
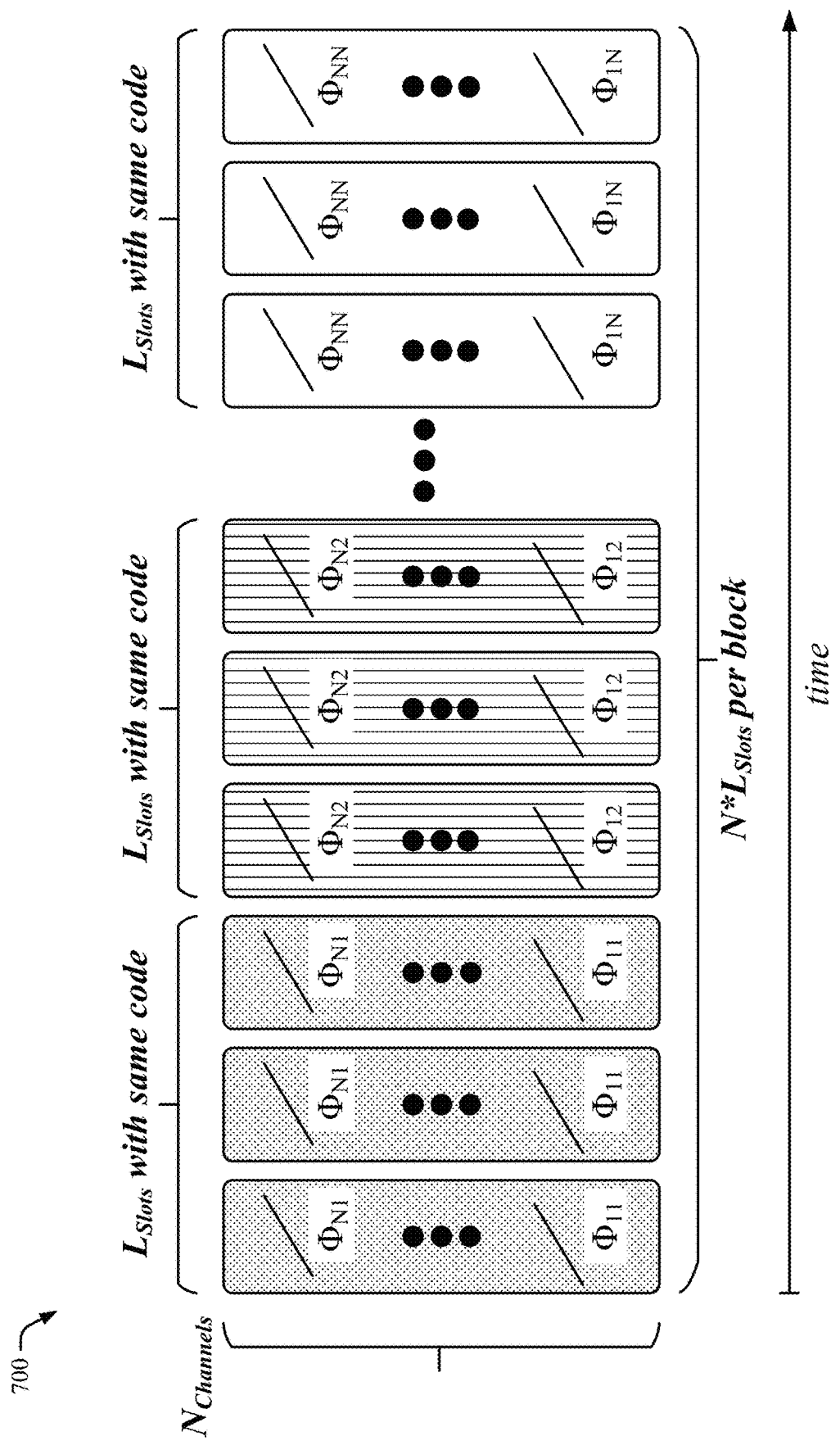

FIG. 7 illustrates a graphical representation of a MIMO waveform 700 that can generally be used for mixed-Doppler interval detection and resolving velocities using Spatial-Block CDM techniques. When two or more targets fall into a same Doppler bin, they have an aliased Doppler value $v_p$. When these targets have different velocities $v_s$, then a mixed-Doppler interval occurs; there is no single phase offset $\theta$ that can correct a Doppler phase offset in the L*N observations Y including $y_1, \ldots, y_{L*N}$. Generation of the waveform 700 can implement a particular Spatial-Block CDM scheme designed to be robust against mixed Doppler intervals.

The waveform 700 supports a MIMO radar system having a quantity N of channels. Each of the channels simultaneously transmits a corresponding radar signal $s_1, \ldots, s_N$. Each spatial block is evenly divided into a quantity of M slots set equal to a product of L and N. Each slot has the same duration $T_s$, which when multiplied by the product of L and N, produces $T_p$ for each spatial block of the waveform 700. L is chosen to be greater than or equal to three. Every L slots in the spatial block is a group of slots that use a unique code of phase shifts for all slots in that group. For example, L is equal to three in the waveform 700. The first three slots use a first code of predefined phase shifts $\Phi_{11}, \ldots, \Phi_{N1}$. The next three slots use a second code of predefined phase shifts $\Phi_{12}, \ldots, \Phi_{N2}$. This sequence repeats until the last three slots, where a code of predefined phase shifts $\Phi_{IN}, \ldots, \Phi_{NN}$ is used. The larger the value of L, the more mixed targets can be recovered. When L is set to three or more, a quantity of L minus one of mixed targets can be recovered.

Equation 16 provides a formula for utilizing the waveform 700 to resolve velocities during mixed-Doppler intervals:

$$Q \cdot s = \begin{bmatrix} e^{j\Phi_{11}} & e^{j\Phi_{21}} & \cdots & e^{j\Phi_{N1}} \\ \vdots & \vdots & \ddots & \vdots \\ e^{j\Phi_{11}} & e^{j\Phi_{21}} & \cdots & e^{j\Phi_{N1}} \\ e^{j\Phi_{12}} & e^{j\Phi_{22}} & \cdots & e^{j\Phi_{N2}} \\ \vdots & \vdots & \ddots & \vdots \\ e^{j\Phi_{12}} & e^{j\Phi_{22}} & \cdots & e^{j\Phi_{N2}} \\ \vdots & & & \\ e^{j\Phi_{1N}} & e^{j\Phi_{2N}} & \cdots & e^{j\Phi_{NN}} \\ \vdots & \vdots & \ddots & \vdots \\ e^{j\Phi_{1N}} & e^{j\Phi_{2N}} & \cdots & e^{j\Phi_{NN}} \end{bmatrix} \cdot \begin{bmatrix} s_1 \\ s_2 \\ \vdots \\ s_N \end{bmatrix} =$$ Equation 16

-continued $$\begin{bmatrix} y_1 e^{j-[0*\theta+0*\psi]} \\ \vdots \\ y_L e^{j-[(L-1)\theta+0*\psi]} \\ y_{L+1} e^{j-[0*\theta+1*\psi]} \\ \vdots \\ y_{2L} e^{j-[(L-1)\theta+1*\psi]} \\ \vdots \\ y_{(N-1)L+1} e^{j-[0*\theta+(N-1)\psi]} \\ \vdots \\ y_L e^{j-[(L-1)\theta+(N-1)\psi]} \end{bmatrix} = Ya(\theta).$$

In Equation 16, the term $\psi$ is equal to L multiplied by the phase offset $\theta$. The phase offset is estimated using Equation 6. For example, N two-dimensional FFTS can be performed across all L slots of K blocks. At each bin of the two-dimensional FFTS, $v_p$ is determined across each block K and $v_s$ is determined across each of the M (e.g., L*N) slots. The two-dimensional FFTS can be separated to improve computation efficiency. For example, as shown in Equations 17 and 18, the FFT that is applied across channel 1 can be computed as:

$$x_1 = [e^{j\Phi_{11}} \; e^{j\Phi_{21}} \; \cdots \; e^{j\Phi_{N1}}] \cdot \begin{bmatrix} s_1 \\ s_2 \\ \vdots \\ s_N \end{bmatrix}.$$ Equation 17

$$\begin{bmatrix} e^{j[0*\theta+0*\psi]} \\ e^{j[1*\theta+0*\psi]} \\ \vdots \\ e^{j[(L-1)\theta+0*\psi]} \end{bmatrix} \cdot x_1 = \begin{bmatrix} y_1 \\ y_2 \\ \vdots \\ y_L \end{bmatrix}.$$ Equation 18

Equation 19 provides a formula to resolve velocities during mixed-Doppler intervals:

$$\begin{bmatrix} e^{j\Phi_{11}} & e^{j\Phi_{21}} & \cdots & e^{j\Phi_{N1}} \\ e^{j\Phi_{12}} & e^{j\Phi_{22}} & \cdots & e^{j\Phi_{N2}} \\ \vdots & \vdots & \ddots & \vdots \\ e^{j\Phi_{1N}} & e^{j\Phi_{2N}} & \cdots & e^{j\Phi_{N1N}} \end{bmatrix} \cdot \begin{bmatrix} s_1 \\ s_2 \\ \vdots \\ s_N \end{bmatrix} = \begin{bmatrix} x_1 \\ x_2 e^{j-\psi} \\ \vdots \\ x_N e^{j-(N-1)\psi} \end{bmatrix}.$$ Equation 19

The above formula can be solved by setting $x_1$ through $x_N$ to be the values obtained from the FFTS applied across each of the N channels. By plugging in an estimated value for $\psi$, Equation 19 can provide the signals $s_1$ through $s_N$.

Example Process

Figure 8:
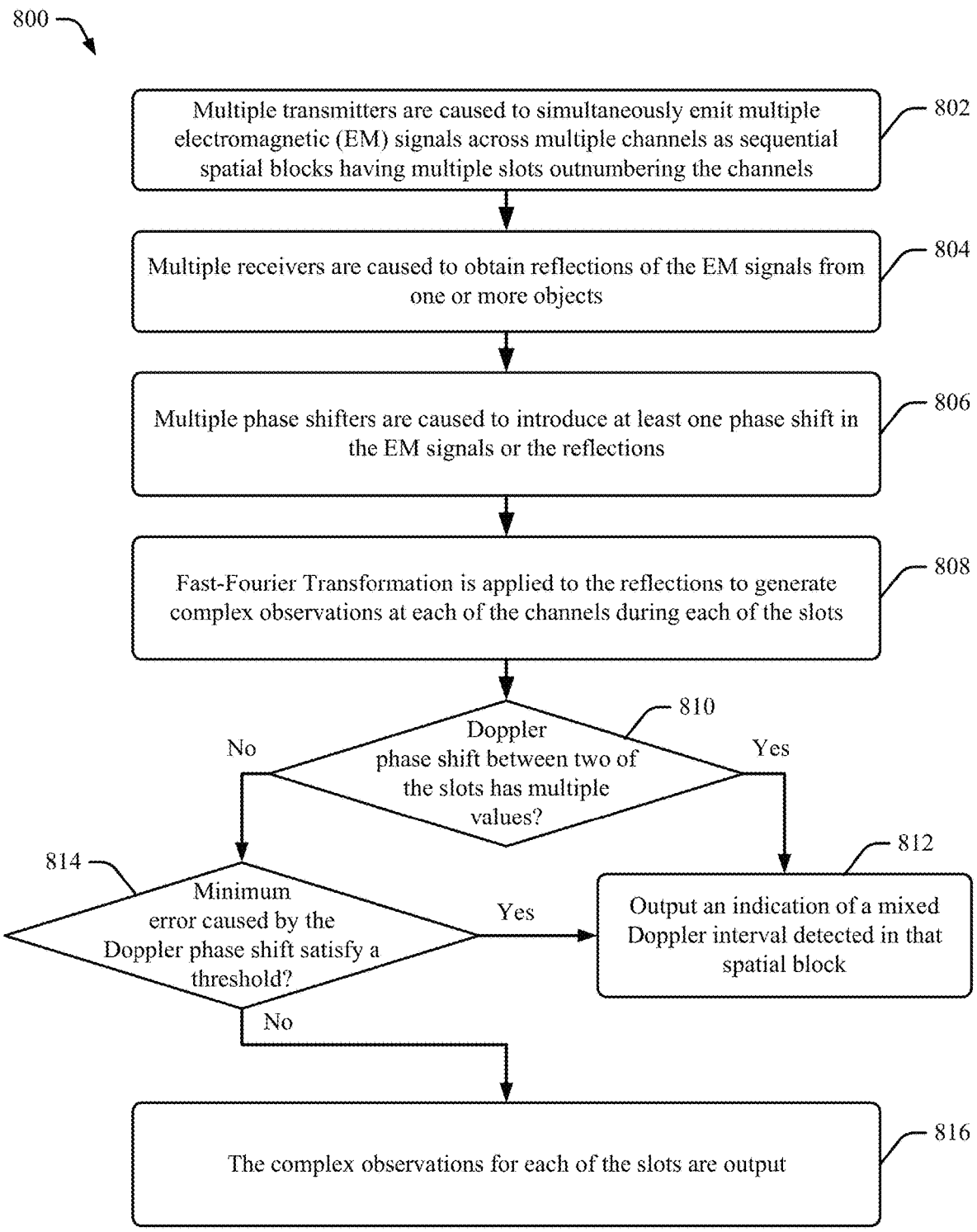
FIG. 8 illustrates an example process for a radar system that uses Spatial-Block CDM for MIMO waveforms, in accordance with techniques of this disclosure.

FIG. 8 illustrates an example process 800 for a radar system that uses Spatial-Block CDM for MIMO waveforms, in accordance with techniques of this disclosure. The process 800 is shown as sets of operations (or acts) performed, but not necessarily limited to the order or combinations in which the operations are shown herein. Further, any of one or more of the operations may be repeated, combined, or reorganized to provide other methods. The process 800 can be executed by the radar system 104 and/or the radar systems 302. For example, the processor 114 can execute instructions stored on the CRM 116 to perform the operations or acts described below.

At 802, multiple transmitters are caused to simultaneously emit multiple electromagnetic (EM) signals across multiple channels as sequential spatial blocks having multiple slots outnumbering the channels. For example, the waveform generator 120 may operate the MMIC 112 to configure the radar system 104 to output a variation of any of the waveforms 400, 500, 600, or 700.

At 804, multiple receivers are caused to obtain reflections of the EM signals from one or more objects. For example, the waveform generator 120 may further operate the radar system 104 to receive the reflections and store them as complex observations.

At 806, multiple phase shifters are caused to introduce at least one phase shift in the EM signals or the reflections. For example, in implementing Spatial-Block CDM, each slot corresponds to a specific code of phase shifts applied by the phase shifters 118 across the channels during that slot.

At 808, a Fast-Fourier Transformation is applied to the reflections to generate complex observations at each of the channels during each of the slots. For example, the processor 114 and/or the MMIC 112 generate Y including $y_1$ to $y_M$ to generate a complex measurement for each slot of a particular channel.

At 810, based on the complex observations, whether a Doppler phase shift between two of the slots has multiple possible values is determined. For example, to determine whether a mixed-Doppler interval occurs, the processor 114 may solve Equation 5 for the phase offset θ, including determining the square error function $\epsilon^2(\theta)$. Then from Equation 14, one or more possible values of the phase offset θ are determined.

A Yes condition out of 810 leads to 812. At 812, responsive to determining that the Doppler phase shift between two of the slots has multiple possible values, an indication of a mixed Doppler interval detected in that spatial block is output. For example, the mixed-Doppler interval module 122 can determine that multiple possible values of the phase offset θ exist, which indicates that a mixed-Doppler interval occurred. This can be resolved using the techniques described above.

A No condition out of 810 leads to 814. At 814, responsive to determining that the Doppler phase shift between two of the slots has only one possible value, whether a minimum error caused by the Doppler phase shift of the single possible value satisfies a mixed interval threshold is determined. For example, a minimum phase offset θ can be determined from the square error function $\epsilon^2(\theta)$.

A Yes condition out of 814, leads to 812, where an indication of the mixed Doppler interval detected in that spatial block is output in response to determining that the minimum error satisfies the mixed interval threshold. For example, if the error introduced by the phase offset θ is too high and the mixed interval threshold is satisfied, a mixed-Doppler interval exists.

A No condition out of 814, leads to 816. At 816, responsive to determining that the minimum error caused by the Doppler phase shift of the single possible value does not satisfy the mixed interval threshold, the complex observations for each of the slots are output. For example, the complex measurements are output for use in further processing (e.g., Doppler processing or angle estimating). This can include compensating the complex observations for the minimum error caused by the Doppler phase shift. For example, if the error is below the mixed interval threshold, then the error is not sufficient for indicating that a mixed-Doppler interval exists. The complex measurements can be compensated, and individual velocities of targets can be resolved.

Analog Beamforming Examples

Figure 9:
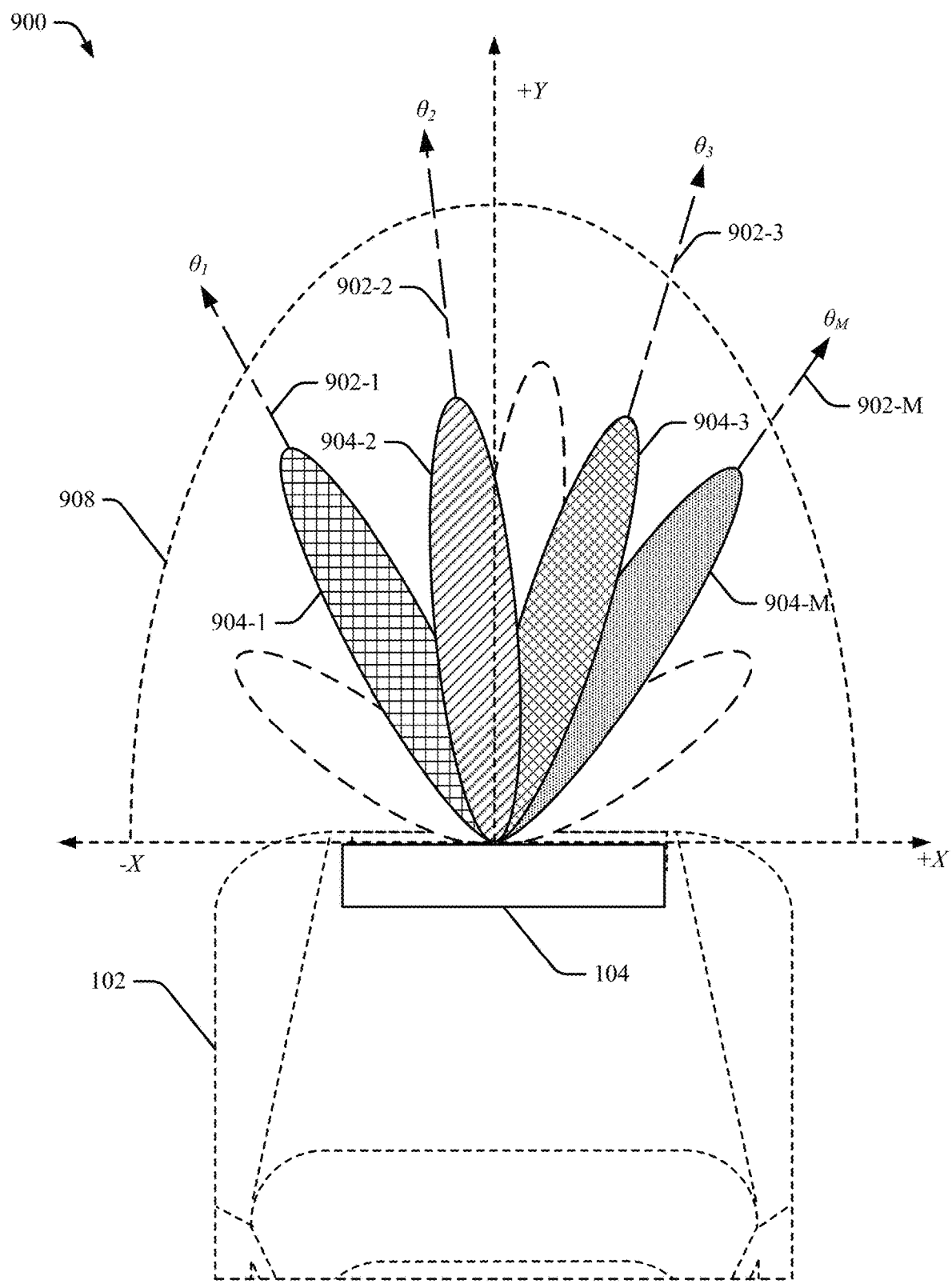
FIG. 9 illustrates an example scenario for analog beamforming with a vehicle radar configured to adopt Spatial-Block CDM for MIMO waveforms, in accordance with techniques of this disclosure.

FIG. 9 illustrates an example scenario 900 for analog beamforming with a vehicle radar configured to adopt Spatial-Block CDM for MIMO waveforms, in accordance with techniques of this disclosure. The scenario 900 is depicted as a birds eye view of the vehicle 102 during execution (e.g., by the driving systems 206) of vehicle functions that rely on radar data output from the radar system 104. Some vehicle functions depend on the radar system 104 being able to provide sufficient coverage and/or sufficient sensitivity for improved driving and safety (e.g., near the object 106). The radar system 104 is configured to transmit and receive radar signals with increased sensitivity (e.g., increase resolution of the field of view 108) and/or increased coverage (e.g., increase to size of the field of view 108) by using the Spatial-Block CDM for MIMO waveform examples, as described above.

As explained above, the waveform 400 supports a MIMO radar system having a quantity N of channels. Each of the channels simultaneously transmits a quantity of N radar signals $s_1, \ldots, s_N$, for a duration $T_p$, which is evenly divided into a quantity of M time slots greater than N (e.g., by one, by more than one) and each having a duration $T_s$.

In one example of the scenario 900, the radar system 104 is configured to operate using the waveform 400 to increase coverage (a size of the field of view 108) provided by the transmitters and receivers. The radar system 104 is configured to apply a specific code of phase shifts (e.g., using the phase shifters 118) across an entire set of N channels during slots 902-1, 902-2, 902-3, and 902-M. The waveform 400 enables the MMIC 112 of the radar system 104 to form a respective analog beam 904-1, 904-2, 904-3, and 904-M focused around a respective angle $\theta_1$, $\theta_2$, $\theta_4$, and $\theta_M$, or respective angular range (e.g., $\theta_1 \pm \Delta_1$, $\theta_2 \pm \Delta_2$, $\theta_3 \pm \Delta_3$, and $\theta_M \pm \Delta_M$) with any radar system having multiple transmit and/or receive channels. The analog beam formed during at least one first slot is directed at a first angle that is a different angle than a second angle associated with the analog beam formed during a second slot to increase coverage provided by the transmitters and the receivers at both angles. For example, the analog beam 904-1 is formed during the slot 902-1 to provide coverage around the angle $\theta_1$ in the field of view 108, and the analog beam 904-2 is formed during the slot 902-2 to extend the coverage provided during the slot 902-1 to provide additional coverage and include the angle $\theta_2$ in the field of view 108. The slots 902-3 and 902-M provide additional coverage and increase the field of view 108 and expand coverage to include additional fields of detection at the angles $\theta_3$ and $\theta_M$.

In another example of the scenario 900, the radar system 104 is configured to operate using the waveform 400 to increase sensitivity (e.g., resolution) provided by the transmitters and receivers at a particular region in the field of view 108. The radar system 104 forms an analog beam during two or more of the M slots at around a same angle. For example, improved resolution can increase accuracy of moving target detections obtained from particular angle or angular range. The analog beam 904-1 can be formed during the slot 902-1 through transmission of the waveform 400 to provide coverage around the angle $\theta_1$. The analog beam 904-2 may be a duplicate of (or similar to) the analog beam 904-1; the angle $\theta_2$ may be approximate or equal to the angle $\theta_1$. However, the analog beam 904-2 is formed during the slot 902-2. By forming the analog beams 904-1 and 904-2 at around the same angles $\theta_1$ and $\theta_2$, the radar system 104 may increase sensitivity at that region of the field of view 108. The slots 902-3 and 902-M can be used to provide additional coverage and/or increased sensitivity at different or similar viewing positions in the field of view 108, depending on desired radar based vehicle functionality.

FURTHER EXAMPLES

Some further examples of Spatial-Block CDM techniques are provided.

Example 1: A system comprising: multiple transmitters configured to simultaneously emit multiple electromagnetic (EM) signals across multiple channels; multiple receivers configured to obtain reflections of the EM signals from one or more objects; multiple phase shifters configured to introduce at least one phase shift in the EM signals or the reflections; and at least one processor configured to: cause the transmitters to emit the EM signals as sequential spatial blocks, each spatial block having multiple slots outnumbering the channels, each slot corresponding to a specific code of phase shifts applied by the phase shifters across the channels during that slot; apply a respective Fast-Fourier Transformation to the reflections to generate complex observations at each of the channels during each of the slots; determine, based on the complex observations, whether a Doppler phase shift between two of the slots has multiple possible values; and responsive to determining that the Doppler phase shift between two of the slots has multiple possible values, output an indication of a mixed Doppler interval detected in that spatial block.

Example 2: The system of example 1, wherein a quantity of the slots is greater than a quantity of the channels by one.

Example 3: The system of any other example, wherein a quantity of the slots is greater than a quantity of the channels by more than one.

Example 4: The system of any other example, wherein the specific code of phase shifts corresponding to at least two of the slots is a same code of phase shifts.

Example 5: The system of any other example, wherein the specific code of phase shifts corresponding to at least two other of the slots is a unique code of phase shifts.

Example 6: The system of any other example, wherein the slots each comprise a group of slots that use a unique code of phase shifts for all slots in that group.

Example 7: The system of any other example, wherein the complex observations are associated with detections inferred by the processor after performing non-coherent integration across all channels.

Example 8: The system of any other example, wherein the complex observations are inferred by the processor prior to performing non-coherent integration across all channels.

Example 9: The system of any other example, wherein the specific code of phase shifts applied by the phase shifters across the channels during each slot forms an analog beam directed at a particular angle.

Example 10: The system of any other example, wherein the analog beam formed during two or more of the slots is directed at a same angle within a field of view of the system to increase sensitivity of the transmitters and of the receivers at that same angle.

Example 11: The system of any other example, wherein the analog beam formed during at least one first slot is directed at a first angle that is a different angle than a second angle associated with the analog beam formed during a second slot to increase coverage provided by the transmitters and the receivers at both angles.

Example 12: The system of any other example, wherein the phase shifters comprise binary phase shifters.

Example 13: The system of any other example, wherein the phase shifters comprise polyphase shifters.

Example 14: The system of any other example, wherein the system comprises a multiple input multiple output (MIMO) radar system.

Example 15: The system of any other example, wherein the system is configured to be installed on an automobile.

Example 16: A computer-readable media comprising instructions that, when executed, configure at least one processor to: cause multiple transmitters of a radar system to simultaneously emit multiple electromagnetic (EM) signals across multiple channels by causing the transmitters to emit the EM signals as sequential spatial blocks, each spatial block having multiple slots outnumbering the channels; cause multiple receivers of the radar system to obtain reflections of the EM signals from one or more objects; cause multiple phase shifters of the radar system to introduce at least one phase shift in the EM signals or the reflections, each slot corresponding to a specific code of phase shifts applied by the phase shifters across the channels during that slot; apply a respective Fast-Fourier Transformation to the reflections to generate complex observations at each of the channels during each of the slots; determine, based on the complex observations, whether a Doppler phase shift between two of the slots has multiple possible values; and responsive to determining that the Doppler phase shift between two of the slots has multiple possible values, output an indication of a mixed Doppler interval detected in that spatial block.

Example 17: A method comprising: causing, by at least one processor, multiple transmitters of a radar system to simultaneously emit multiple electromagnetic (EM) signals across multiple channels by causing the transmitters to emit the EM signals as sequential spatial blocks, each spatial block having multiple slots outnumbering the channels; causing, by the processor, multiple receivers of the radar system to obtain reflections of the EM signals from one or more objects; causing, by the processor, multiple phase shifters of the radar system to introduce at least one phase shift in the EM signals or the reflections, each slot corresponding to a specific code of phase shifts applied by the phase shifters across the channels during that slot; applying, by the processor, a respective Fast-Fourier Transformation to the reflections to generate complex observations at each of the channels during each of the slots; determining, by the processor, based on the complex observations, whether a Doppler phase shift between two of the slots has multiple possible values; and responsive to determining that the Doppler phase shift between two of the slots has multiple possible values, outputting, by the processor, an indication of a mixed Doppler interval detected in that spatial block.

Example 18: The method of any other example, further comprising: responsive to determining that the Doppler phase shift between two of the slots does not have multiple possible values, determining, by the processor, whether a minimum error caused by the Doppler phase shift of a single possible value satisfies a mixed interval threshold; and outputting, by the processor, the indication of the mixed Doppler interval detected in that spatial block in response to determining that the minimum error satisfies the mixed interval threshold.

Example 19: The method of any other example, further comprising: responsive to determining that the minimum error caused by the Doppler phase shift of the single possible value does not satisfy the mixed interval threshold, outputting, by the processor, the complex observations for each of the slots for use in Doppler processing or angle estimating.

Example 20: The method of any other example, further comprising: responsive to determining that the minimum error caused by the Doppler phase shift of the single possible value does not satisfy the mixed interval threshold, compensating the complex observations for the minimum error caused by the Doppler phase shift.

Example 21: The method of any other example, wherein the radar system comprises the system of any of examples 1-15.

Example 22: A system comprising means for performing the method of any example above.

Example 23: A system comprising a processor configured to perform the method of any example above.

Example 24: Computer readable media including instructions that, when executed, cause a processor to perform the method of any example above.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims. The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A system comprising:
    multiple transmitters configured to simultaneously emit multiple electromagnetic (EM) signals across multiple channels;
    multiple receivers configured to obtain reflections of the EM signals from one or more objects;
    multiple phase shifters configured to introduce at least one phase shift in the EM signals or the reflections; and
    at least one processor configured to:
        cause the transmitters to emit the EM signals as sequential spatial blocks, each spatial block having multiple slots outnumbering the channels, each slot corresponding to a specific code of phase shifts applied by the phase shifters across the channels during that slot;
        apply a respective Fast-Fourier Transformation to the reflections to generate complex observations at each of the channels during each of the slots;
        determine, based on the complex observations, whether a Doppler phase shift between two of the slots included in a spatial block has multiple possible values, the specific code of phase shifts corresponding to at least two of the slots that outnumber the channels is a same code of phase shifts; and
        responsive to determining that the Doppler phase shift between two of the slots has multiple possible values, output an indication of a mixed Doppler interval detected in that spatial block.

2. The system of claim 1, wherein a quantity of the slots is greater than a quantity of the channels by one.

3. The system of claim 1, wherein a quantity of the slots is greater than a quantity of the channels by more than one.

4. The system of claim 1, wherein the specific code of phase shifts corresponding to at least two other of the slots is a unique code of phase shifts.

5. The system of claim 1, wherein the slots each comprise a group of slots that use a unique code of phase shifts for all slots in that group.

6. The system of claim 1, wherein the complex observations are associated with detections inferred by the processor after performing non-coherent integration across all channels.

7. The system of claim 1, wherein the complex observations are inferred by the processor prior to performing non-coherent integration across all channels.

8. The system of claim 1, wherein the specific code of phase shifts applied by the phase shifters across the channels during each slot forms an analog beam directed at a particular angle.

9. The system of claim 8, wherein the analog beam formed during two or more of the slots is directed at the particular angle within a field of view of the system to increase sensitivity of the transmitters and of the receivers at that particular angle.

10. The system of claim 8, wherein the analog beam formed during at least one first slot is directed at a first angle that is a different angle than a second angle associated with the analog beam formed during a second slot to increase coverage provided by the transmitters and the receivers at both angles.

11. The system of claim 1, wherein the phase shifters comprise binary phase shifters.

12. The system of claim 1, wherein the phase shifters comprise polyphase shifters.

13. The system of claim 1, wherein the system comprises a multiple input multiple output (MIMO) radar system.

14. The system of claim 1, wherein the system is configured to be installed on an automobile.

15. A non-transitory computer-readable media comprising instructions that, when executed, configure at least one processor to:
    cause multiple transmitters of a radar system to simultaneously emit multiple electromagnetic (EM) signals across multiple channels by causing the transmitters to emit the EM signals as sequential spatial blocks, each spatial block having multiple slots outnumbering the channels;
    cause multiple receivers of the radar system to obtain reflections of the EM signals from one or more objects;
    cause multiple phase shifters of the radar system to introduce at least one phase shift in the EM signals or the reflections, each slot corresponding to a specific code of phase shifts applied by the phase shifters across the channels during that slot;
    apply a respective Fast-Fourier Transformation to the reflections to generate complex observations at each of the channels during each of the slots;
    determine, based on the complex observations, whether a Doppler phase shift between two of the slots included in a spatial block has multiple possible values, the specific code of phase shifts corresponding to at least two of the slots is a same code of phase shifts; and responsive to determining that the Doppler phase shift between two of the slots has multiple possible values, output an indication of a mixed Doppler interval detected in that spatial block.

16. A method comprising:

causing, by at least one processor, multiple transmitters of a radar system to simultaneously emit multiple electromagnetic (EM) signals across multiple channels by causing the transmitters to emit the EM signals as sequential spatial blocks, each spatial block having multiple slots outnumbering the channels;

causing, by the processor, multiple receivers of the radar system to obtain reflections of the EM signals from one or more objects;

causing, by the processor, multiple phase shifters of the radar system to introduce at least one phase shift in the EM signals or the reflections, each slot corresponding to a specific code of phase shifts applied by the phase shifters across the channels during that slot;

applying, by the processor, a respective Fast-Fourier Transformation to the reflections to generate complex observations at each of the channels during each of the slots;

determining, by the processor, based on the complex observations, whether a Doppler phase shift between two of the slots included in a spatial block has multiple possible values, the specific code of phase shifts corresponding to at least two of the slots is a same code of phase shifts; and selectively outputting, by the processor, an indication of a mixed Doppler interval detected in that spatial block based on determining that the Doppler phase shift between two of the slots has multiple possible values.

17. The method of claim 16, further comprising:

determining, by the processor, whether a minimum error caused by the Doppler phase shift of a single possible value satisfies a mixed interval threshold; and outputting, by the processor, the indication of the mixed Doppler interval detected in that spatial block in response to determining that the minimum error satisfies the mixed interval threshold.

18. The method of claim 17, further comprising:

selectively outputting, by the processor, the complex observations for each of the slots for use in Doppler processing or angle estimating based on whether the minimum error caused by the Doppler phase shift of the single possible value does not satisfy the mixed interval threshold.

19. The method of claim 17, further comprising:

responsive to determining that the minimum error caused by the Doppler phase shift of the single possible value does not satisfy the mixed interval threshold, compensating the complex observations for the minimum error caused by the Doppler phase shift.

* * * * *